(12) United States Patent
Zhou et al.

(10) Patent No.: US 7,379,999 B1
(45) Date of Patent: May 27, 2008

(54) ON-LINE SERVICE/APPLICATION MONITORING AND REPORTING SYSTEM

(75) Inventors: Sheng Zhou, Redmond, WA (US); Theodore Ludovicus Michel, Bellevue, WA (US); Thomas Scott Coon, Kirkland, WA (US); Benjamin Elliott Canning, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 798 days.

(21) Appl. No.: 10/685,641

(22) Filed: Oct. 15, 2003

(51) Int. Cl.
*G06F 13/00* (2006.01)

(52) U.S. Cl. ............ 709/224; 709/250; 719/318

(58) Field of Classification Search .......... 709/217, 709/219, 223, 224, 225, 250; 719/318
See application file for complete search history.

(56) References Cited

U.S. PATENT DOCUMENTS

| | | | |
|---|---|---|---|
| 6,085,224 A | 7/2000 | Wagner | |
| 6,363,421 B2 | 3/2002 | Barker et al. | |
| 6,366,658 B1 * | 4/2002 | Bjornberg et al. | 379/221.08 |
| 6,751,573 B1 * | 6/2004 | Burch | 702/178 |
| 6,971,109 B1 * | 11/2005 | Williams et al. | 719/318 |
| 6,979,995 B2 * | 12/2005 | Horio et al. | 324/76.48 |
| 7,146,327 B1 | 12/2006 | Howard et al. | |
| 2003/0126240 A1 * | 7/2003 | Vosseler | 709/221 |
| 2004/0078228 A1 * | 4/2004 | Fitzgerald et al. | 705/2 |

OTHER PUBLICATIONS

Office Action dated Jul. 13, 2007 in U.S. Appl. No. 11/047,317, 6 pages.

* cited by examiner

*Primary Examiner*—Viet D. Vu
(74) *Attorney, Agent, or Firm*—Merchant & Gould

(57) ABSTRACT

An event monitoring and logging system, including apparatuses and methods, for instrumenting an on-line application program, or service, for generating and communicating events upon the occurrence of certain conditions during the execution thereof, for monitoring generated events in real and near-real time in accordance with configurable rules, for generating and communicating selected alerts to appropriate personnel upon the exceeding of configurable thresholds, for logging generated events and related information in data files and databases for subsequent analysis, and for producing reports related to such instrumentation and generated events.

38 Claims, 16 Drawing Sheets

FIG. 5

```
<Courier>
- <Group>
 - <Genre Name="MonitorConfig">
  - <Record Type="string">
   - <![CDATA[
<?xml version="1.0" ?>
<config>
 <monitorconfig>
  <generalconfig>
   <maxmeasurementspan>1800</maxmeasurementspan>
   <thresholdcheckinterval>5</thresholdcheckinterval>
   <nteventwriteinterval>10</nteventwriteinterval>
   <droppedeventsthreshold>1</droppedeventsthreshold>
  </generalconfig>
  <countingrules>
   <rule id="345" eventid="1903718264" offset="8" value="1234" timespan="5" comparison="3" />
   <rule id="346" eventid="1969777002" timespan="30" comparison="3" />
   <rule id="347" eventid="1969776999" timespan="30" comparison="3" />
   <rule id="348" eventid="1953589113" timespan="30" comparison="3" />
   <rule id="349" eventid="1969846391" timespan="30" comparison="3" />
   <rule id="350" eventid="1969846392" timespan="30" comparison="3" />
  </countingrules>
  <thresholds>
   <threshold id="445" ruleid="350" value="0" comparison="2" />
   <threshold id="446" ruleid="351" value="0" comparison="2" />
   <threshold id="447" ruleid="352" value="0" comparison="2" />
   <threshold id="448" ruleid="353" value="5" comparison="2" />
   <threshold id="449" ruleid="354" value="0" comparison="2" />
   <threshold id="450" ruleid="355" value="5" comparison="2" />
  </thresholds>
 </monitorconfig>
</config>
]]>
  </Record>
 </Genre>
</Group>
</Courier>
```

500

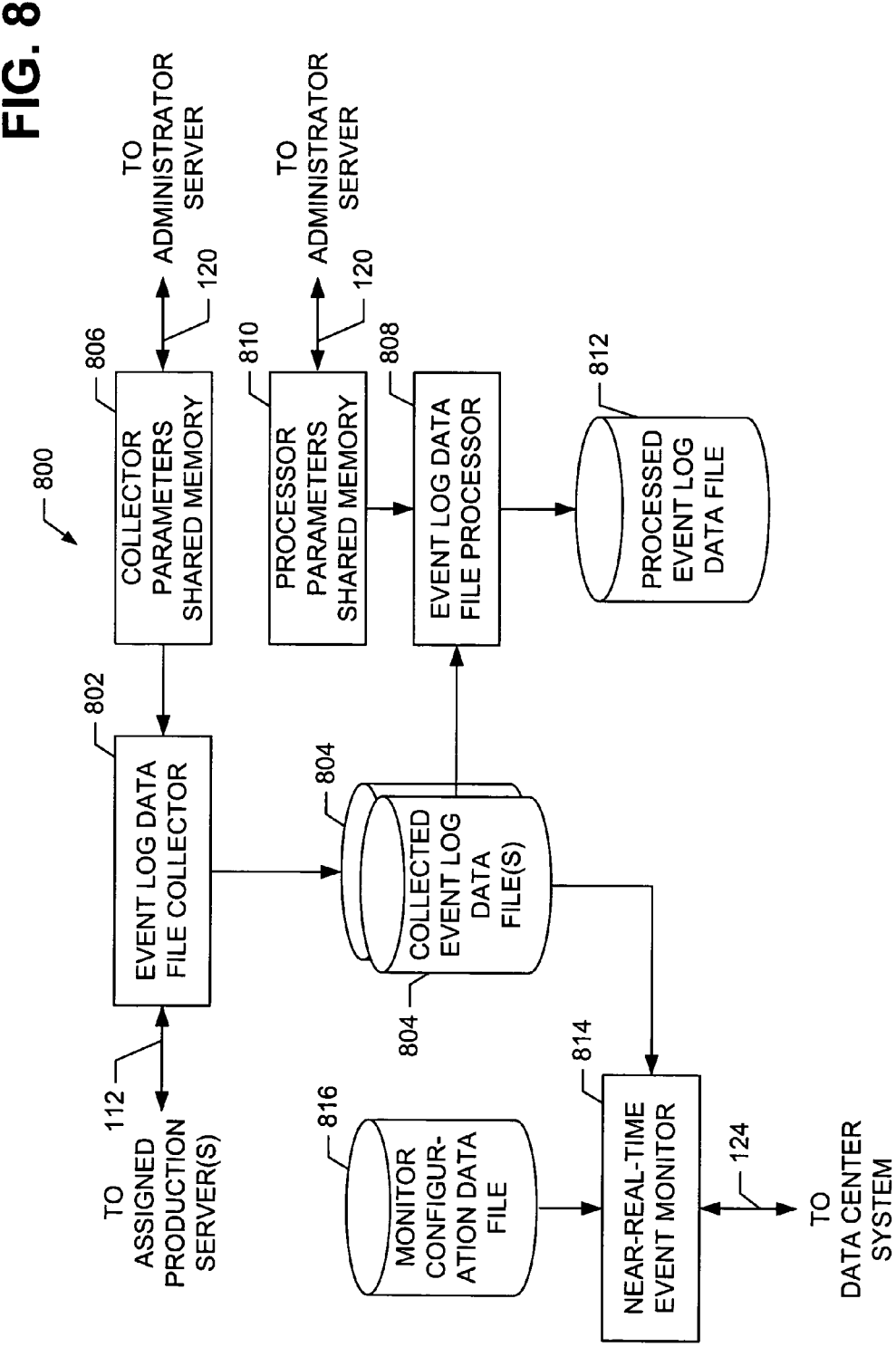

FIG. 9

The total ULS events tagged are 1243 as of Dec 3rd.

☒ Export To Excel.

| Tagged ULS event Summary | | | | | | | | | | | |
|---|---|---|---|---|---|---|---|---|---|---|---|
| | Total | Total file # | PerfMon | Critical | Exception | Assert | Unexpected | Monitorable | High | Medium | Verbose |
| ⊟ Authoring | 123 | 234 | 329 | 123 | 138 | 232 | 329 | 432 | 434 | 424 | 366 |
| collaboration | 23 | 6 | 45 | 23 | 21 | 6 | 45 | 56 | 78 | 34 | 32 |
| Research | 34 | 5 | 6 | 4 | 2 | 1 | 7 | 3 | 2 | 2 | 1 |
| Reference | 15 | 5 | 6 | 4 | 2 | 1 | 7 | 3 | 2 | 2 | 1 |
| Translation | 16 | 5 | 6 | 4 | 2 | 1 | 7 | 3 | 2 | 2 | 1 |
| Fax | 21 | 5 | 6 | 4 | 2 | 1 | 7 | 3 | 2 | 2 | 1 |
| ⊞ AWS | 343 | 23 | 45 | 23 | 21 | 5 | 45 | 56 | 78 | 34 | 23 |
| ⊞ CTMS | 23 | 23 | 45 | 23 | 21 | 6 | 45 | 56 | 78 | 34 | 13 |
| ⊞ DDS | 343 | 23 | 45 | 23 | 21 | 5 | 45 | 56 | 78 | 34 | 23 |
| ⊞ BI | 45 | 23 | 45 | 23 | 21 | 5 | 45 | 56 | 78 | 34 | 32 |
| ⊞ DnR | 334 | 23 | 45 | 23 | 21 | 5 | 45 | 56 | 78 | 34 | 23 |
| ⊞ DSS | 343 | 23 | 45 | 23 | 21 | 5 | 45 | 56 | 78 | 34 | 13 |
| ⊞ IM/N | 45 | 23 | 45 | 23 | 21 | 5 | 45 | 56 | 78 | 34 | 23 |
| ⊞ MPD | 56 | 23 | 45 | 23 | 21 | 5 | 45 | 56 | 78 | 34 | 32 |
| ⊞ MPS | 78 | 23 | 45 | 23 | 21 | 5 | 45 | 56 | 78 | 34 | 23 |
| ⊞ Foundation | 90 | 23 | 45 | 23 | 21 | 5 | 45 | 56 | 78 | 34 | 13 |
| ⊞ QnS | 45 | 23 | 45 | 23 | 21 | 5 | 45 | 56 | 78 | 34 | 23 |
| ⊞ STS | 79 | 23 | 45 | 23 | 21 | 5 | 45 | 56 | 78 | 34 | 32 |
| ⊞ UIS | 90 | 23 | 45 | 23 | 21 | 5 | 45 | 56 | 78 | 34 | 23 |
| ⊞ IPO | 78 | 23 | 45 | 23 | 21 | 5 | 45 | 56 | 78 | 34 | 13 |
| ⊞ XDocs | 34 | 23 | 45 | 23 | 21 | 5 | 45 | 56 | 78 | 34 | 23 |
| ⊞ RTC | 23 | 23 | 45 | 23 | 21 | 5 | 45 | 56 | 78 | 34 | 23 |
| ⊞ Frontpage | 56 | 23 | 45 | 23 | 21 | 5 | 45 | 56 | 78 | 34 | 12 |
| ⊞ Publishing | 232 | 23 | 45 | 23 | 21 | 5 | 45 | 56 | 78 | 34 | 11 |

Query By [Office team ▼] Team name: [Authoring ▼]  ◉ All events  [Go]
 ○ Update after: [12/06/01]

There are 34 event records been returned from this query.

Event list:

| Tag ID | Service | File name | Dev alias | Update | Event level | Event string |
|--------|---------|-----------|-----------|--------|-------------|--------------|
| QDEF | FAX | faxsender.cs | Johnfoo | 12/04/01 | ULS.Trace | set cover data |
| QDEG | FAX | faxsender.cs | Johnfoo | 12/04/01 | ULS.Trace | set cover data |
| QSED | Research | Research.cs | Johnbar | 12/05/01 | ULS.Assert | Test only |
| QSEF | Research | Research.cs | Johnbar | 12/05/01 | ULS.Assert | Test only |

☒ Export To Excel

FIG. 11

Event detail: ⟵ 1100

| | |
|---|---|
| Tag ID | QWED |
| Team | Authoring |
| Service | Reference |
| Source file | webs\fax\faxsender\faxsender.cs |
| Line # | 231 |
| Last update | 12/02/01 |
| Dev Domain | Redmond |
| Dev alias | Johnfoo |
| Category | msoulscat_faxsender_cs |
| Event type | ULS.Trace |
| Event string | Set cover page data --> subject: %S comments: %S date: %S |

[Close]

FIG. 12

Date: Day: 08 Dec 2001 ▼ [Go]   [Export To Excel]

The total occurrences of ULS event is 23456.

Tagged ULS event Summary

| | Total | Critical | Exception | Assert | Unexpected | Monitorable | High | % of |
|---|---|---|---|---|---|---|---|---|
| ⊞ Authoring | 123 | 123 | 138 | 232 | 329 | 432 | 434 | 11.2 |
| ⊞ Collaboration | 23 | 4 | 2 | 5 | 7 | 3 | 2 | 3.21 |
| Research | 34 | 4 | 2 | 1 | 7 | 3 | 2 | 2.12 |
| Reference | 15 | 4 | 2 | 1 | 7 | 3 | 2 | 3.01 |
| Translation | 16 | 4 | 2 | 1 | 7 | 3 | 2 | 2.76 |
| Fax | 21 | 4 | 2 | 1 | 7 | 3 | 2 | 1.10 |
| ⊞ AWS | 343 | 23 | 21 | 5 | 45 | 56 | 78 | 5.23 |
| ⊞ CTMS | 23 | 23 | 21 | 5 | 45 | 56 | 78 | 6.78 |
| ⊞ DDS | 343 | 23 | 21 | 5 | 45 | 56 | 78 | 8.03 |
| ⊞ BI | 45 | 23 | 21 | 5 | 45 | 56 | 78 | 2.34 |
| ⊞ DnR | 334 | 23 | 21 | 5 | 45 | 56 | 78 | 4.56 |
| ⊞ DSS | 343 | 23 | 21 | 5 | 45 | 56 | 78 | 1.89 |
| ⊞ IM/N | 45 | 23 | 21 | 5 | 45 | 56 | 78 | 3.11 |
| ⊞ MPD | 56 | 23 | 21 | 5 | 45 | 56 | 78 | 2.12 |
| ⊞ MPS | 78 | 23 | 21 | 5 | 45 | 56 | 78 | 1.34 |
| ⊞ Foundation | 90 | 23 | 21 | 5 | 45 | 56 | 78 | 3.34 |
| ⊞ QnS | 46 | 23 | 21 | 5 | 45 | 56 | 78 | 4.56 |
| ⊞ STS | 79 | 23 | 21 | 5 | 45 | 56 | 78 | 1.89 |
| ⊞ UIS | 90 | 23 | 21 | 5 | 45 | 56 | 78 | 3.11 |
| ⊞ IPD | 78 | 23 | 21 | 5 | 45 | 56 | 78 | 2.12 |
| ⊞ XDocs | 34 | 23 | 21 | 5 | 45 | 56 | 78 | 1.34 |
| ⊞ RTC | 23 | 23 | 21 | 5 | 45 | 56 | 78 | 3.34 |
| ⊞ Frontpage | 56 | 23 | 21 | 5 | 45 | 56 | 78 | 2.34 |

Date: | Day: 08 Dec 2001 | ▼ | Query By | All Office.NET | ▼ | Go |   | 📊 Export To Excel

1300

Top Events list:

| Tag ID | Occurrences | % of All | Service | Dev alias | Event level | Event string |
|---|---|---|---|---|---|---|
| ⊞ QDEF | 1278 | 3.41% | Free/Busy | Johnfoo1 | ULS.Trace | I'm the top 1 ULS event!!! |
| TK2OFFWB01 | 345 | 1.01% |  |  |  |  |
| TK2OFFWB02 | 435 | 1.20% |  |  |  |  |
| TK2OFFWB03 | 345 | 1.01% |  |  |  |  |
| ⊞ QDEG | 1121 | 2.98% | Dad Watson | Johnfoo2 | ULS.Trace | I'm the top 2 ULS event!!! |
| ⊞ QSED | 983 | 2.74% | Research | Johnbar1 | ULS.Assert | I'm the top 3 ULS event!!! |
| ⊞ QSEF | 873 | 2.67% | Fax | Johnbar2 | ULS.Assert | I'm the top 4 ULS event!!! |
| Research |  |  | 34 | 5 | 4 | 2 |
| Reference |  |  | 15 | 5 | 4 |  |
| Translation |  |  | 16 | 5 | 4 | 2 |

FIG. 15

Server: TKOFFDGLWB02

Date: 12/01/01   approximate time: 2:30 PM   [search]

| File Name | Start time |
|---|---|
| TKOFFDGLWB02-ULS-12012001-1413.etl | 2:13 PM |
| TKOFFDGLWB02-ULS-12012001-1423.etl | 2:23 PM |
| TKOFFDGLWB02-ULS-12012001-1443.etl | 2:33 PM |

The log files can be find at \\POULS\ACHIVE\ULS-LOGS\

ON-LINE SERVICE/APPLICATION MONITORING AND REPORTING SYSTEM

TECHNICAL FIELD

The present invention relates, generally, to the field of software performance monitoring and, more specifically, to systems, apparatuses, and methods for monitoring and logging generated events in an instrumented on-line service/application.

BACKGROUND OF THE INVENTION

Recently, various fundamental computer application programs such as word processing, database programs, intranet email and other application programs have been converted for offer and use on-line service platforms. For instance, Microsoft® Office 2003 provides several "suite" services that have been traditionally offered as fixed media software through an Internet-accessible web site. On-line services or applications are hosted at a server-side central data center which is communicatively linked to remote client-side terminals. Principal goals of this on-line service include presenting, sorting and distributing documents universally across a network of client terminals and servers with 24 hour, 7 day/week accessibility.

The quality and stability of on-line service software requires a different level of quality and stability from failure than previous client-side software. Instead of a failure affecting the quality of service on one machine or on one network only, a failure of an on-line service may impose catastrophic effects on users on a widespread level. Exponential numbers of individual or business customers may be adversely affected by a single software-based problem. As such, the reputation and goodwill of the software vendor is at stake, in addition to future business revenues. Also at stake are potentially lost financial resources resulting from haphazard debugging efforts and lost development time for future projects.

Given the critical need for on-line service reliability, there are numerous event generation and logging mechanisms available to developers. For instance, Microsoft® Windows NT® provides the NT event log for monitoring selected events. Another event monitor is the Microsoft® Windows NT® PerfMon counter. These event generation and logging mechanisms are operational to monitor events, report deficiencies and enhance debugging capabilities for on-line service code. Although NT event log and PerfMon are useful by themselves, they are limited in terms of log storage capacity. Storage limitations will affect the types of events that can be captured and monitored for troubleshooting.

The different design considerations, security levels and technologies that may be used to create an "integrated" on-line service serve to create discrepancies in the quality and depth of instrumentation capabilities within and between interrelated software code. Developers may be confused as to what instrumentation technologies to use and may, therefore, instrument their software code in an inconsistent manner or, in some cases, not at all. Ultimately, the gaps in monitoring, maintenance and debugging capabilities make providing a consistently reliable on-line service difficult to implement.

Therefore, consistent, in depth instrumentation is critical for a commercially practical on-line service. Developers should be able to instrument integrated software code for an on-line service by using one unified logging service. Consistency, at least in basic logging standards will encourage uniformity in the use of instrumentation and eliminate confusion about what kind of events to log and how to log them. The instrumentation should have minimal effect on substantive software code in terms of overhead and should be universal enough to replace all existing logging and tracing technologies. To accomplish this, the instrumentation has to be universal enough to support event generation from a variety of code sources, event levels and event categories. In addition, the instrumentation has to meet the monitoring and reporting needs of the technical support developers who maintain the operation of on-line services.

For instance, technical support to provide real time monitoring of events is required to maintain a commercially viable quality of service for an on-line service. Real-time monitoring would notify operators almost immediately when a problem occurs for a first line of rapid troubleshooting. In order to implement a real-time monitoring system, outputted events would have to be analyzed and prioritized based on time critical diagnosis criteria. A rule based monitoring method that is operational to watch for the occurrences of events in a certain time interval according to specified thresholds is one way to distinguish between time critical events for real time monitoring and less critical events.

There is a need, therefore, in the industry for a system, including apparatuses and methods, for instrumenting on-line service software code to generate events, for monitoring generated events, for alerting appropriate personnel upon the occurrence of certain generated events, and for logging generated events for subsequent use in troubleshooting and debugging on-line service software code.

SUMMARY OF THE INVENTION

Briefly described, the present invention comprises systems, apparatuses, and methods for generating, monitoring, acting upon, storing, and reporting events which are pre-embedded in the source software code of an on-line service application for improving the quality of service and stability from failure thereof. More particularly, the present invention comprises an event monitoring and logging system, including apparatuses and methods, for instrumenting an on-line service application program, or service, for generating and communicating events upon the occurrence of certain conditions during the execution thereof, for monitoring generated events in real and near-real time in accordance with configurable rules, for generating and communicating alerts to appropriate personnel upon the exceeding of configurable thresholds, for logging generated events and related information in data files and databases for subsequent analysis, and for producing reports related to such instrumentation and generated events.

Advantageously, the present invention allows software developers to instrument the source software code of an on-line service application for the generation of events of specified event types and/or levels during execution of an executable on-line service application created therefrom. The generated events may be monitored in real-time and/or in near-real-time according to pre-established rules and thresholds (also sometimes referred to herein as "threshold criteria") and according to configuration parameters which may be modified at run-time during operation of the on-line service application, in order to determine whether such events require the generation and communication of alerts to appropriate personnel. Data associated with the generated events is logged in both binary and textual forms to enable troubleshooters, software developers, and/or other personnel to analyze the generated events and the context of their generation.

Other advantages and benefits of the present invention will become apparent upon reading and understanding the present specification when taken in conjunction with the appended drawings.

BRIEF DESCRIPTION OF THE DRAWINGS

FIG. 5 displays an exemplary monitor configuration data file in accordance with the embodiment of the present invention.

FIG. 8 displays a plurality of software components of each processing server in accordance with the embodiment of the present invention.

FIG. 9 displays an exemplary tagging overview report of the event monitoring and logging system in accordance with the embodiment of the present invention.

FIG. 10 displays an exemplary query tagged event report of the event monitoring and logging system in accordance with the embodiment of the present invention.

FIG. 11 displays an exemplary event detail pane of the event monitoring and logging system 100 in accordance with the embodiment of the present invention.

FIG. 12 displays an exemplary events summary report of the event monitoring and logging system in accordance with the embodiment of the present invention.

FIG. 13 displays an exemplary top event list report of the event monitoring and logging system in accordance with the embodiment of the present invention.

FIG. 15 displays an exemplary find log file utility of the event monitoring and logging system in accordance with the embodiment of the present invention.

DETAILED DESCRIPTION OF THE INVENTION

Figure 1:
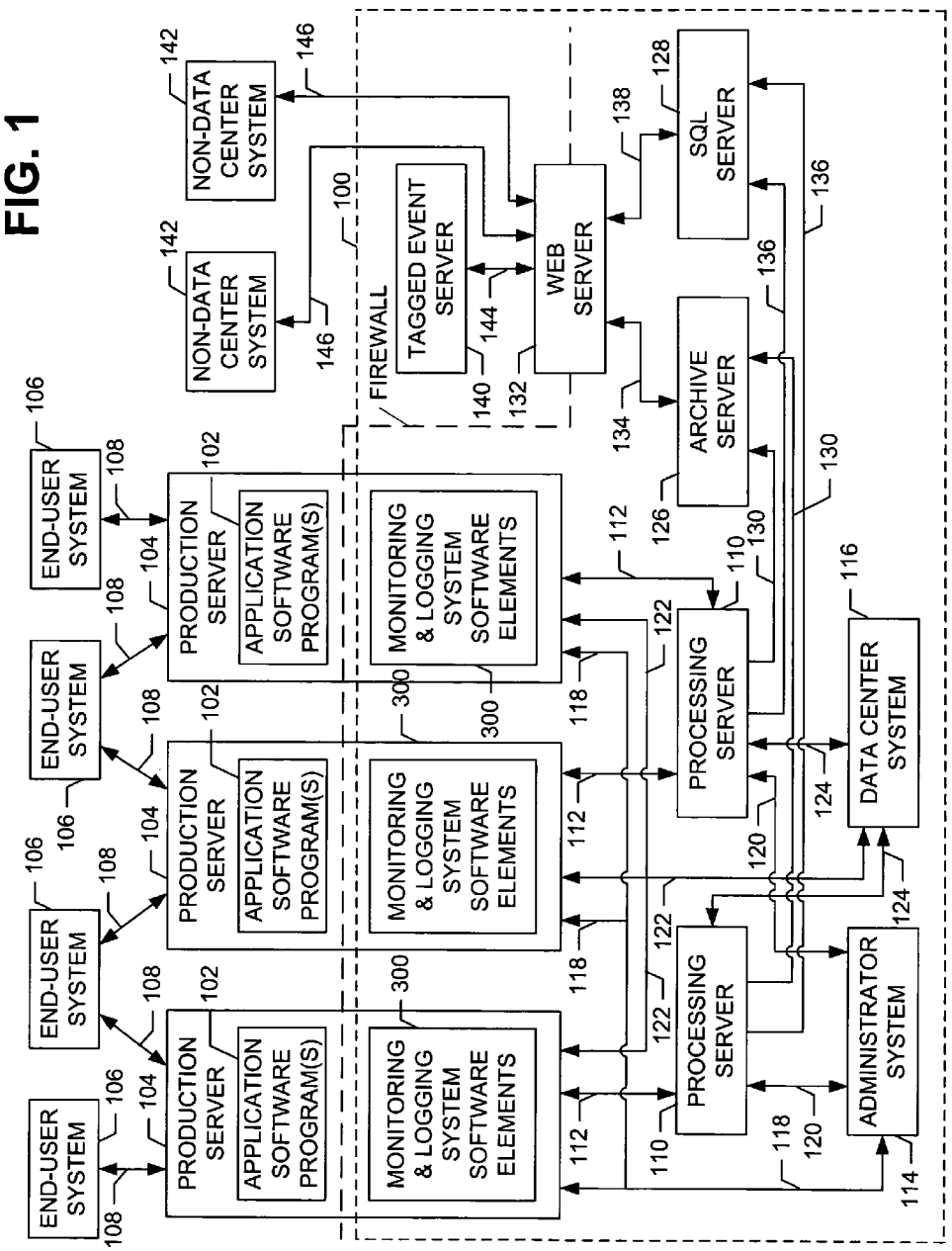
FIG. 1 displays a block diagram representation of an event monitoring and logging system and an environment therefor in accordance with an embodiment of the present invention.

Referring now to the drawings, in which like numerals represent like components or steps throughout the several views, FIG. 1 displays a block diagram representation of an event monitoring and logging system 100 and an environment therefor in accordance with an embodiment of the present invention. The event monitoring and logging system 100 (also sometimes referred to herein as the "system 100") enables the monitoring and logging of events that may occur relative to on-line computer software application programs 102 (also sometimes referred to herein as "services 102" or "service applications 102") which reside on and are executable by production server computer systems 104 (also sometimes referred to herein as "production servers 104") at the direction of end-users. Such services 102 include, for example and not limitation, word processing programs, spreadsheet programs, presentation programs, security programs, and other computer software application and related programs which have been previously instrumented by their developers to generate certain events having associated types, or categories, and associated levels, upon the occurrence of certain corresponding conditions encountered during their execution by the production servers 104.

The system 100 is configurable by a system administrator or other appropriate personnel, at runtime and during execution of the services 102, to detect and selectively act only upon one or more of (i) certain specified generated events, (ii) certain specified types, or categories, of generated events (also sometimes referred to herein as "event types"), (iii) generated events having certain specified levels (also sometimes referred to herein as "event levels"), and/or (iv) generated events which exceed certain thresholds. By monitoring and logging the occurrence of such generated events and information related thereto, the system 100 provides system administrators of the production servers 104 and/or developers of the services 102 executing thereon with information related to their operation and execution which may alert them to potential problems before they become critical and possibly cause the failure of the services 102. Further, because the system 100 is configurable during operation with respect to particular generated events, event types, and/or event levels that it detects and acts upon, the system 100 allows a system administrator and/or developers to configure the system 100 to disregard certain generated events and/or minimize the volume of information produced with respect to generated events that are not of particular interest, and to focus, instead, on generated events related to a particular potential problem or issue of concern by considering such generated events and/or maximizing the volume of information produced with respect thereto.

The production servers 104 and their services 102, as illustrated in FIG. 1, are accessible by end-users through the end-users' use of their respective end-user computer systems 106 which are connectable to the production servers 104 through respective communication links 108. The production servers 104 operate, generally, twenty-four hours per day, seven days per week and end-users may execute services 102 thereon after establishing a communication session and providing appropriate security information such as, for example and not limitation, a user name and password. Each production server 104 and end-user computer system 106, preferably, comprise respective hardware components similar to those of the computer system 210 described below with reference to FIG. 2, and respective software components, including respective computer operating systems and communications software, which enable the establishment of an interactive communication session therebetween and the selection of a service 102 by an end-user for execution by the production server 104. Exemplary computer operating systems for each production server 104 and end-user computer system 106 include, respectively, Microsoft® Windows® NT Back Office Server and Microsoft® Windows® XP. Exemplary communications software for each end-user computer system 106 includes Microsoft® Internet Explorer®.

The event monitoring and logging system 100 comprises a plurality of software components 300, described in more detail below with reference to FIG. 3, which reside and are stored on each production server 104 having a service 102 to be monitored. The software components 300 include, generally, a plurality of computer software programs or routines and a plurality of data elements which, when executed and/or utilized by a respective production server 104 in connection with a service 102, direct and cause the production server 104 to: generate events upon the occurrence or existence of particular conditions during the execution of a service 102 or related computer program; configure and start concurrent event tracing sessions (i.e., a real-time tracing session and a near-real-time tracing session) for the service 102; monitor a stream of generated events from the service 102 in real-time according to one or more thresholds (including, logical expressions and threshold values) and configuration parameters; produce and send alerts to a data center system 116, described below, when the thresholds are exceeded by generated events identified for real-time monitoring in accordance with such configuration parameters; and, store such generated events and data related thereto in event log data files 328.

The event monitoring and logging system 100 also comprises a plurality of processing servers 110 which connect, via respective communication links 112, to the production servers 104 for the communication of generated events and associated data from the production servers 104 to the processing servers 110. Each processing server 110 communicatively connects to one or more production server(s) 104 and, as a consequence, a processing server 110 which connects to more than one production server 104 receives generated events and associated data which relate, respectively, to more than service 102. Each processing server 110, preferably, comprises respective hardware components similar to those of the computer system 210 described below with reference to FIG. 2, and respective software components 800, described below with reference to FIG. 8, including a plurality of computer software programs and/or routines and a plurality of data elements which, when executed and/or utilized by a processing server's processing unit, direct and cause the processing server 110 to: receive and collect event log data files 328 from the one or more production server(s) 104 to which the processing server 110 is connected; communicate the collected event log data files 804 to an archive server 126, described in more detail below; process and convert the collected event log files from binary format to text format; communicate the collected event log data files 804, in text format, to a SQL Server 128 described below; monitor the generated events present in the collected event log data files 328 in near-real-time and in accordance with one or more settings, thresholds (including, logical expressions and threshold values), and/or configuration parameters; and, produce and send alerts to a data center system 116, described below, when the thresholds are exceeded by generated events of the collected event log data files 328 which are identified for near-real-time monitoring in accordance with such configuration parameters.

As illustrated in FIG. 1, the event monitoring and logging system 100 additionally comprises an administrator computer system 114 (also sometimes referred to herein as an "administrator system 114") and a data center computer system 116. The administrator system 114 connects to each production server 104 and to each processing server 110 through respective communication links 118, 120 for the communication of instructions and data to the production and processing servers 104, 110. The administrator system 114 comprises computer hardware components substantially similar to those described with respect to FIG. 2 below and software components that include computer software programming and routines which, when selected by a system administrator and executed by the administrator system's processing unit, perform a number of tasks with respect to each production server 104 and processing server 110. With respect to each production server 104, such tasks include, without limitation: establishing and changing settings, thresholds, and/or configuration parameters respectively associated with and utilized by the software components 300 residing on the production server 104 to selectively control thereon event generation, event processing, and alert generation; and, communicating respective instructions and settings, thresholds, and/or configuration parameters to such software components 300 via communication links 118 during or prior to operation. With respect to each processing server 110, such tasks include, but are not limited to: establishing and changing settings, thresholds, and/or configuration parameters respectively associated with and utilized by the software components 800 residing on the processing server 110; and, communicating respective instructions and settings, thresholds, and/or configuration parameters to the software components 800 via communication links 120 during or prior to operation.

The data center computer system 116 (also sometimes referred to herein as a "data center system 116") communicatively connects to the production and processing servers 104, 110 through respective communication links 122, 124 for the receipt of alerts and associated event information from the production and processing servers 104, 110. The data center system 116 comprises computer hardware components substantially similar to those described with respect to computer system 210 of FIG. 2 below and software components that include appropriate computer software programming and routines. When selected by data center personnel and executed by the data center system's processing unit, the computer software programming and routines: enable data center personnel to view event logs containing events and related event information present therein; receive alerts with their associated events and event information communicated, through communication links 122, 124, from the production and processing servers 104, 110 to the data center system 116; and, notify a data center troubleshooter of the alerts and display information related to the alerts and the event(s) corresponding thereto so that the data center troubleshooter, system engineers, developers, and/or other personnel may take appropriate actions to analyze and resolve, if necessary, the conditions occurring within the service 102 which caused the generation of the event(s).

The event monitoring and logging system 100, in addition, comprises an archive server computer system 126, a database server computer system 128, and a web server computer system 132 which are also sometimes referred to herein, respectively, as an archive server 126, a database server 128, and a web server 132. The archive server 126 communicatively connects to each processing server 110 through respective communication links 130 and to the web server 132 through communication link 134. The archive server 126 comprises computer hardware components substantially similar to those described with respect to computer system 210 of FIG. 2 below and software components that include appropriate computer software programming and routines to, as described below, receive collected event log data files 804 from the processing servers 110, store the collected event log data files 804, and purge collected event log data files 804 having a pre-determined age.

The archive server 126 is operable to receive collected event log data files 804 from each processing server 110 and to store the collected event log data files 804 in a single folder. More particularly, the single folder includes a plurality of sub-folders with each sub-folder being associated with a date on which collected event log data files 804 were generated by the processing servers 110. Because each collected event log data file 804 has a name which identifies the production server 104 and the date on which it was created, location of particular collected event log data files 804 for analysis at a later date is relatively easy.

The archive server 126 is also operable to purge older collected event log data files 804 from the folder in which the collected event log data files 804 are stored. In this regard, the archive server 126 includes a batch job or scheduled process which it executes on a daily basis to delete collected event log data files 804 which are older than a pre-determined period of time. Preferably, collected event log data files 804 which are older than two weeks are deleted from the archive server 126. The archive server 126 is additionally operable to provide collected event log data files 804 to developers and other non-data center personnel via web server 132 and communication link 134 so that they may review the collected event log data files 804 while attempting to diagnose a problem or difficulty with a service 102. It should be noted that although only one archive server 126 is displayed in FIG. 1, the scope of the present invention comprises event monitoring and logging systems 100 which include one or more archive server(s) 126.

The database server 128 communicatively connects to each processing server 110 through respective communication links 136 and to a web server 132 through communication link 138. The database server 128 comprises computer hardware components substantially similar to those described with respect to computer system 210 of FIG. 2 below and software components that include computer software programming and routines which are appropriate to receive and aggregate processed event log data files 812 from the processing servers 110 and to provide event and associated event information to the web server 132 for subsequent provision to developers and other personnel. Preferably, the database server 128 includes SQL database management software which is adapted to provide the functionality described herein.

The database server 128 is operable to receive processed event log data files 812 (i.e., including event log data in text form) from each processing server 110 and to load the event and associated event information into a database, thereby aggregating such information in one location. The database server 128 is also operable to receive commands communicated to the database server 128 by web server 132, via communication link 138, and to provide event and associated event information to the web server 132 in response to the received commands. It should be noted that although only one database server 128 is displayed in FIG. 1, the scope of the present invention comprises event monitoring and logging systems 100 which include one or more database server(s) 128.

The web server 132 resides on the firewall between a data center and non-data center personnel (including, software developers and others), and communicatively connects to a tagged event server 140, described in more detail below, and non-data center personnel computer systems 142 (also sometimes referred to herein as "non-data center systems 142") via respective communication links 144, 146 for the bi-directional communication of commands and data therebetween. The web server 132 comprises computer hardware components substantially similar to those described with respect to computer system 210 of FIG. 2 below and software components that include computer software programming and routines, executable by the web server's processing unit, which: enable a user to select the below described reports and utility for generation or operation, as the case may be; receive user inputs for generation of the reports or execution of the utility; generate the reports; provide the functionality of the below described utility; and, otherwise, provide web hosting for such services.

The event monitoring and logging system 100 further comprises a tagged event server 140 having a tagged event database residing thereon. The tagged event server 140 comprises computer hardware components substantially similar to those described with respect to computer system 210 of FIG. 2 below and software components that include computer software programming and routines, executable by the tagged event server's processing unit, which cause or enable the tagged event server 140 to: receive information, from an event tagging module 402 (described below) during execution thereof, which relates to events or transaction instances designated in a source code file(s) for a service 102 by calls to procedures 304 or by performance counter event definitions 310, described below (such information including, without limitation, event messages comprising the text messages provided as arguments of the event generation procedures 304 and which may be written to an event log data file 328, but with the "C"-style parameter replacement notation of the text messages being replaced with simple positional notation (e.g., %1, %2, . . . , % n)); assign a unique tag identifier to each call to a procedure 304 (i.e., the tag identifiers correspond to an Event ID of an event or transaction instance depending on whether the corresponding call to a procedure 304 relates to an event or transaction instance); create and store unique entries in the tagged event database corresponding on a one-to-one basis with each call to a procedure 304 or definition 310 (and, hence, on a one-to-one basis with an associated event or transaction instance) with the entries, respectively, storing the uniquely assigned tag identifiers (i.e., such entries being referred to sometimes herein as "tag entries") and other received information associated with an event or transaction instance; communicating the tag identifiers back to the event tagging module 402; and, provide tag entry information (i.e., detailed event information) to the web server 132 for use in reports generated by the web server 132.

The tagged event database stores a plurality of tag entries with each tag entry including information, or data, associated on a one-to-one basis, as briefly described above, with each occurrence of a call to an event procedure 304 of the event generator API 302 or performance counter event definition 310 that is embedded or referenced in a source code file of a service 102. Such information, preferably, includes: a tag identifier corresponding to an Event ID which may relate to an event or to an instance of a transaction; a source code filename corresponding to the source code file in which the call to the event procedure 304 or reference to a header file 314 having performance counter definitions 310 is found; a line number identifying the line number in the source code file at which the call to the event procedure 304 or reference to a header file 314 is found; a last update date indicating the date on which the present tag entry was generated by the tagging module 402 of the application build computer system 404; a developer alias identifying the software developer who is responsible for the line of source code in which the called event procedure 304 or reference to header file 314 is present; a domain identifier which identifies the logical domain to which the developer alias belongs; a category identifier which identifies the category (which is, preferably, associated in one-to-one correspondence with the source code file in which the called event procedure 304 or reference to header file 314 is present) to which the present tag entry belongs; an event message corresponding to an event or instance of a transaction (i.e., depending on whether the called event procedure 304 relates to an event or to an instance of a transaction) which is to be displayed, or printed, when information relating to an occurrence of the event or instance of the transaction is displayed or printed; an event type identifier which identifies the type of event or instance of a transaction designated, or specified, in the call to the event procedure 304 by a software developer; and, a level identifier which identifies the event level designated, or specified, in the call to the event procedure 304 by a software developer.

It should be noted that communication links 108, 146 comprise the communication facilities necessary to allow bi-directional communication sessions to be respectively established, via one or more media, between the end-user computer systems 106 and the production servers 104 and between non-data center personnel computer systems 142 and the web server 132. Such facilities and infrastructure include, for example and not limitation, one or more of the public switched telephone network (PSTN), the Internet, local area networks (LANs), wide area networks (WANs), and other forms of communication networks existing now or in the future having analog, digital, wired and wireless communication channels (including, but not limited to wired communication channels providing plain old telephone service (POTS), ISDN service, xDSL service, broadband cable service, or other communication services, wireless communication channels providing radio frequency, optical (e.g., infrared), satellite, or other communication services, and carrier technologies utilizing copper wire, optical fiber, radio frequency signals, infrared signals, satellites, or other technologies, devices, and materials).

It should also be noted that communication links 112, 118, 120, 122, 124, 130, 134, 136, 138, 144 comprise the communication facilities necessary to enable the establishment of necessary bi-directional or uni-directional communication sessions, via one or more media, during operation of the event monitoring and logging system 100. Such facilities and infrastructure include, for example and not limitation, one or more of the local area networks (LANs), wide area networks (WANs), and other forms of communication networks existing now or in the future having analog, digital, wired and wireless communication channels (including, but not limited to wired communication channels providing plain old telephone service (POTS), ISDN service, xDSL service, broadband cable service, or other communication services, wireless communication channels providing radio frequency, optical (e.g., infrared), satellite, or other communication services, and carrier technologies utilizing copper wire, optical fiber, radio frequency signals, infrared signals, satellites, or other technologies, devices, and materials).

Figure 2:
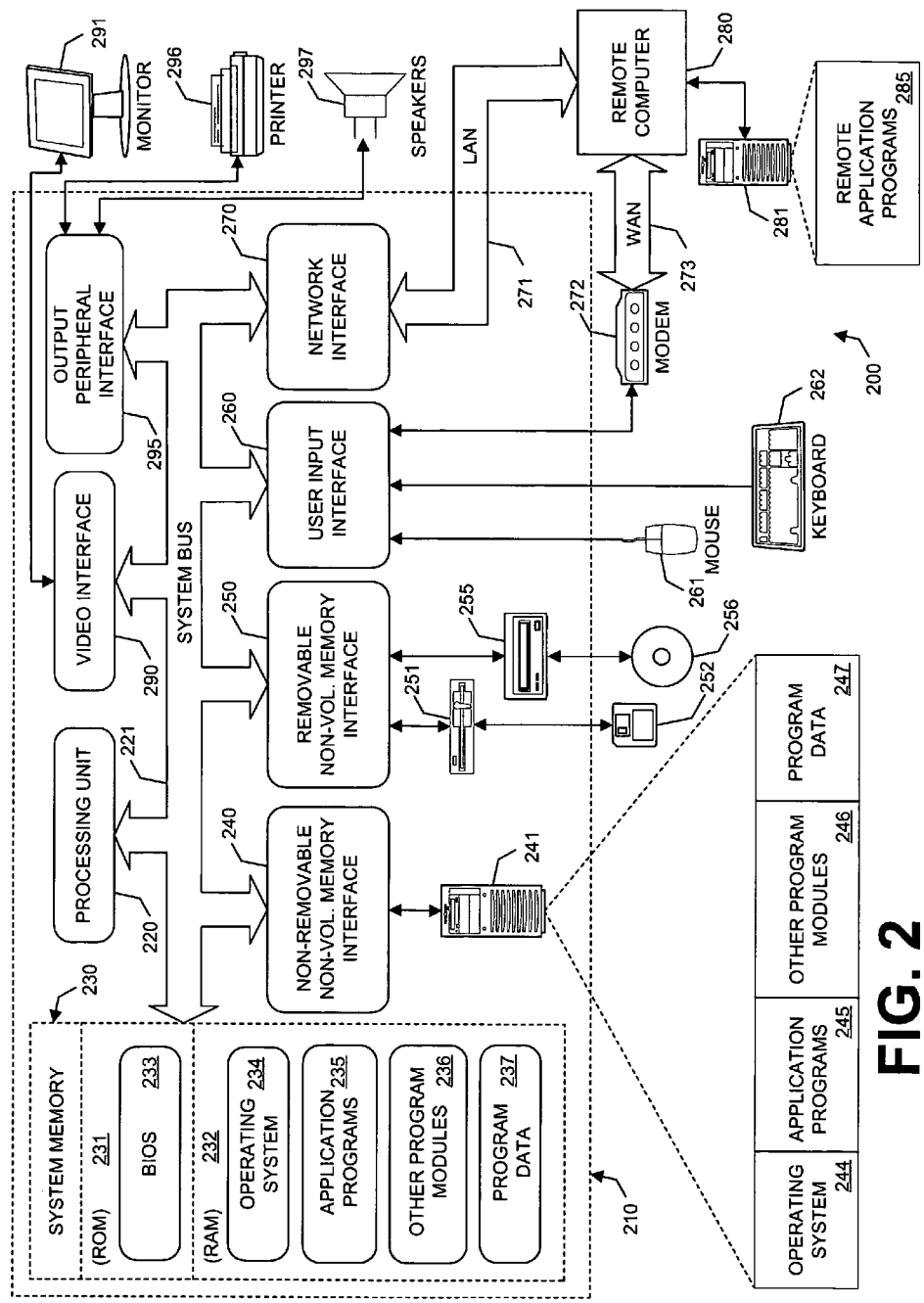
FIG. 2 displays a block diagram representation of a computing environment and computer systems thereof which the present invention may utilize in accordance with the embodiment thereof.

FIG. 2 displays a block diagram representation of a computing environment 200 and computer systems 210, 280 thereof which the present invention may utilize in accordance with the present embodiment thereof. The computing environment 200 and computer systems 210, 280 thereof represent only one example of a suitable computing environment and computer systems for the practice of the present invention and are not intended to suggest any limitation as to the scope of use or functionality of the invention. Nor should the computer systems 210, 280 be interpreted as having any dependency or requirement relating to any one or combination of components illustrated in the exemplary computing environment 200.

Hence, it should be understood that the present invention is operational with numerous other general purpose or special purpose computing system environments or configurations. Examples of well-known computing systems, environments, and/or configurations that may be appropriate or suitable for use as computer systems of the present invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The present invention may also be described in the general context of comprising computer-executable instructions, such as program modules, being executed by a computer system. Generally, program modules include routines, programs, programming, objects, components, data, data structures, etc. that perform particular tasks or implement particular abstract data types. The present invention may be practiced in distributed computing environments where tasks are performed by remote processing devices that are linked through a communications network. In a distributed computing environment, program modules may be located in both local and remote computer storage media, including, without limitation, in memory storage devices.

With reference to FIG. 2, exemplary computer systems of the present invention include general purpose computing devices in the form of a computer system 210. Components of computer system 210 may include, but are not limited to, a processing unit 220, a system memory 230, and a system bus 221 that couples various system components including the system memory 230 to the processing unit 220 for bi-directional data and/or instruction communication. The system bus 221 may be any of several types of bus structures including a memory bus or memory controller, a peripheral bus, and a local bus using any of a variety of bus architectures. By way of example, and not limitation, such architectures include the Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as the "Mezzanine bus").

Computer system 210, preferably, includes a variety of computer-readable media. Computer-readable media may comprise any available media that can be accessed by, read from, or written to by computer system 210 and may include both volatile and nonvolatile, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data, data structures, program modules, programs, programming, or routines. Computer storage media includes, but is not limited to, RAM, ROM, EEPROM, flash memory or other memory technology, CD-ROM, digital versatile disks (DVD) or other optical disk storage, magnetic cassettes, magnetic tape, magneto-optical storage devices, magnetic disk storage or other magnetic storage devices, or any other medium which can be used to store the desired information and which can be accessed by computer system 210. Communication media typically embodies computer-readable instructions, data, data structures, program modules, programs, programming, or routines in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of any of the above are also included within the scope of computer-readable media.

The system memory 230 includes computer storage media in the form of volatile and/or nonvolatile memory such as read only memory (ROM) 231 and random access memory (RAM) 232. A basic input/output system 233 (BIOS), containing the basic routines that direct the transfer of information between elements within computer 210, such as during start-up, is typically stored in ROM 231. RAM 232 typically stores data and/or program instructions that are immediately accessible to and/or presently being operated on by processing unit 220. By way of example, and not limitation, FIG. 2 illustrates operating system 234, application programs 235, other program modules 236, and program data 237 which may be resident in RAM 232, in whole or in part, from time-to-time.

The computer 210 may also include other removable/non-removable, volatile/nonvolatile computer storage media. By way of example only, FIG. 2 illustrates a hard disk drive 241 that reads from or writes to non-removable, nonvolatile magnetic media, a magnetic disk drive 251 that reads from or writes to a removable, nonvolatile magnetic disk 252, and an optical disk drive 255 that reads from or writes to a removable, nonvolatile optical disk 256 such as a CD ROM or other optical media. Other removable/non-removable, volatile/nonvolatile computer storage media that may be included in the exemplary computing environment 200 include, but are not limited to, magnetic tape cassettes, flash memory cards, digital versatile disks, digital video tape, solid state RAM, solid state ROM, and the like. The hard disk drive 241 is typically connected to the system bus 221 through a non-removable memory interface such as interface 240, and magnetic disk drive 251 and optical disk drive 255 are typically connected to the system bus 221 by a removable memory interface, such as interface 250.

The drives 241, 251, 255 and their associated computer storage media discussed above and illustrated in FIG. 2, provide storage of computer-readable instructions, data, data structures, program modules, programs, programming, or routines for computer system 210. In FIG. 2, for example, hard disk drive 241 is illustrated as storing operating system 244, application programs 245, other program modules 246, and program data 247. Note that these components may either be the same as or different from operating system 234, application programs 235, other program modules 236, and program data 237. Operating system 244, application programs 245, other program modules 246, and program data 247 are given different numbers to illustrate that, at a minimum, they are different copies of operating system 234, application programs 235, other program modules 236, and program data 237. A user may enter commands and information into computer system 210 through connected input devices such as a keyboard 262 and pointing device 261, commonly referred to as a mouse, trackball or touch pad. Other connected input devices (not shown) may include a microphone, joystick, game pad, satellite dish, scanner, or the like. These and other input devices are often connected to the processing unit 220 through a user input interface 260 that is coupled to the system bus 221, but may be connected by other interface and bus structures, such as a parallel port, game port or a universal serial bus (USB). A monitor 291 or other type of display device is also connected to the system bus 221 via an interface, such as a video interface 290. In addition to the monitor 291, computer system 210 may also include other peripheral output devices such as speakers 297 and printer 296, which may be connected through an output peripheral interface 295.

The computer system 210 may operate in a networked environment using bi-directional communication connection links to one or more remote computer systems, such as a remote computer system 280. The remote computer system 280 may be a personal computer, a laptop computer, a server computer, a router, a network PC, a peer device or other common network node, and typically includes many or all of the elements described above relative to the computer system 210, although only a memory storage device 281 of remote computer system 280 has been illustrated in FIG. 2. The bi-directional communication connection links depicted in FIG. 2 include a local area network (LAN) 271 and a wide area network (WAN) 273, but may also include other networks. Such networks are commonplace in offices, enterprise-wide computer networks, intranets and the Internet.

When communicatively connected to a LAN 271, the computer system 210 connects to the LAN 271 through a network interface or adapter 270. When communicatively connected to a WAN 273, the computer system 210 typically includes a modem 272 or other means for establishing a communication link over the WAN 273, such as the Internet. The modem 272, which may be internal or external, may be connected to the system bus 221 via the user input interface 260, or other appropriate mechanism. In a networked environment, program modules depicted relative to the computer system 210, or portions thereof, may be stored in the remote memory storage device 281. By way of example, and not limitation, FIG. 2 illustrates remote application programs 285 as residing in memory storage device 281. It will be appreciated that the network connections shown are exemplary and other means of establishing a bi-directional communication link between the computers may be used.

Figure 3:
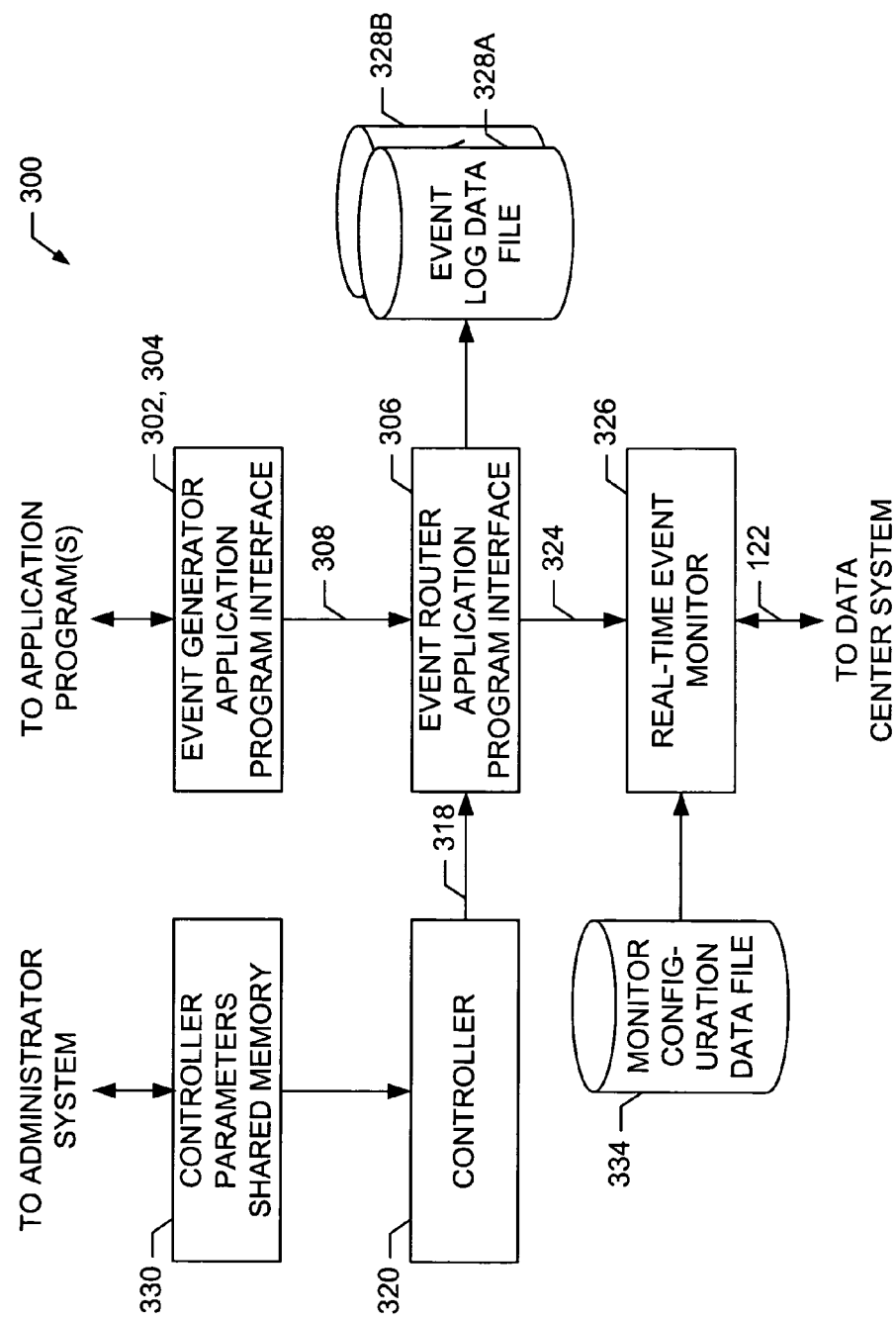
FIG. 3 displays a block diagram representation of software components of the event monitoring and logging system residing on each production server in accordance with the embodiment of the present invention.

FIG. 3 displays a block diagram representation of software components 300 of the event monitoring and logging system 100 which reside and are stored on each production server 104 in accordance with an embodiment of the present invention. The software components 300 comprise an event generator application program interface 302 (also sometimes referred to herein as the "event generator API 302") which resides on the production server 104 in combination with a computer software application program 102, or service 102, to be executed by the production server 104. The event generator API 302 includes a plurality of computer software procedures 304, or routines 304, that may be identified by a software developer and embedded in the source code of the service 102 during programming of the service 102 (see FIG. 4) to instrument the service 102, and that are invoked (or "called") and executed by the production server 104 when certain conditions (i.e., pre-identified by the software developer) occur during execution of the service 102 by the production server 104. When invoked and executed by the production server 104, the procedures 304 cause the production server 104 to generate respective events with associated event information, or data, (also sometimes referred to herein as "generated events" and "generated event data") as desired and determined appropriate by the software developer for communication to an event router application program interface 306 (described below) via inter-process communication link 308.

Each of the plurality of procedures 304 of the event generator API 302 corresponds to a particular type of event and is identified in the source code of the service 102 by a software developer to, typically, cause the generation of an event (and associated event data) having a type which is appropriate for an associated condition occurring during the service's execution or for the logging of information helpful to diagnose problems with the service 102. The types of events include, but are not limited to: (i) a critical event; (ii) a general diagnostic, or trace, event; (iii) a transaction event; (iv) a ship assert event; (v) an assert event; (vi) an exception event; and, (vii) a performance counter event. A critical event is identified by a software developer for generation during a service's execution when the service 102 encounters an error state, or condition, serious enough that someone should be paged or otherwise contacted to address the service's condition. A general diagnostic, or trace, event is identified and embedded in the source code when a software developer desires to log diagnostic data representing the state, or condition, of the service 102 at the time and location in the source code that the event is encountered during execution of the service 102. A transaction event is identified for generation by a software developer in the source code of a service 102 to track the duration of a multi-stage process of the service 102 when more than one instance of the process may be contemporaneously executing on the production server 104, and allows multiple events to be properly identified as "children" of a single transaction. Ship assert events and assert events are identified and embedded in the source code of a service 102 when a software developer desires to cause the generation of a logged event and, optionally, a dump in production and debug grades of code. An exception event is embedded by a software developer in a service's source code when the developer desires to determine when handled exceptions occur during the service's execution. A performance counter event is identified by a software developer for generation during a service's execution to log the value of a specified variable.

The plurality of procedures 304 of the event generator API 302 includes two procedures 304A, 304B which are associated with and cause the generation of a critical event. The first procedure 304A, sometimes referred to herein as the "CriticalEvent" procedure 304A, has a first argument (i.e., "Message") which defines the message to be placed into an event log data file 328 upon the generation of an associated critical event. The message may include text and insertion characters (% d, % s, and others in accordance with the "C" programming language) that identify locations where the values of the variables pointed to by such insertion characters are to be inserted when the message is written to the event log data file 328. The CriticalEvent 304A may also include optional arguments identifying the variables storing the values for such insertion.

The second procedure 304B, sometimes referred to herein as the "CriticalEventTag" procedure 304B, corresponds to the tagged form of the "CriticalEvent" procedure 304A after operation of the event tagging module 402 on a service's source code during building of the service 102. The "CriticalEventTag" procedure 304B has three primary arguments identified as "Event ID", "Category", and "Compressed Message". The Event ID argument comprises a unique identifier which is generated for and assigned to the corresponding event (i.e., by the tagged event server 140) when an executable service 102 is "built" from the service's associated source code as described below. The Category argument corresponds to and identifies the source code file from which the relevant portion of the service 102 was "built" and is automatically generated for the source code file and assigned to the event by the tagged event server 140. The Category argument may be utilized to identify the event, or a set of related events, in an event log data file 328. The Compressed Message argument represents a version of the text specified by the Message argument described above and includes only the passed parameters, thereby allowing a determination of how many and what kind of parameters were passed. The CriticalEventTag procedure 304B may also include other optional arguments.

The plurality of procedures 304 of the event generator API 302 also includes two procedures 304C, 304D which are associated with and cause the generation of a general diagnostic logging, or trace, event. The first procedure 304C, sometimes referred to herein as the "TraceEvent" procedure 304C, has a first argument (i.e., "Level") which identifies the level of granularity of event information to be written to an event log data file 328 or displayed in a report 900, 1000, 1200, 1300, 1400 in association with the event if such event is written to an event log data file 328 or displayed in a report 900, 1000, 1200, 1300, 1400. A value for the Level argument is selected and set by the software developer during coding and is compared with the value of a run-time level parameter, as described below, to determine (i.e., with the exception of events having a Level of "critical" which are always written to an event log data file 328) which general diagnostic, or trace, events are to be written to an event log data file 328 during execution of the service 102. The following table provides certain exemplary levels and their corresponding values and descriptions:

| Level | Value | Description |
| --- | --- | --- |
| Critical | 1 | Major problem (i.e., a crash) is about to occur |
| Exception | 4 | Exception was reported |
| Assert | 7 | Assert was generated |
| Unexpected | 10 | Unexpected condition has occurred |
| Monitorable | 15 | Any event that should be monitored, but doesn't fit other levels |
| High | 20 | High level user action/major functional area |
| Medium | 50 | Mid-level functional area |
| Verbose | 100 | Low-level details |
| Extreme | 255 | Extremely low-level details, including every function entry and exit |

It should be noted that if no run-time level parameter is specified for a service 102, the default run-time level parameter is "high" and, as a consequence, the production server 104 writes, or logs, general diagnostic, or trace, events having a Level argument with a value of 20 or lower to an event log data file 328. It should also be noted that the logging of general diagnostic, or trace, events to an event log data file 328 may be controlled by an event's category, thereby causing the production server 104 to write, or log, general diagnostic, or trace, events to an event log data file 328 even though no run-time level parameter exists and such events have a Level argument with a value equal to or lower than the value of the default run-time level parameter. The "TraceEvent" procedure 304C also has optional "Message" and other arguments which may be specified by a software developer during coding. The Message and other arguments are substantially similar to the Message and optional arguments described above with respect to the "CriticalEvent" procedure 304A.

The second procedure 304D (also sometimes referred to herein as the "TraceEventTag" procedure 304D) associated with the general diagnostic, or trace, event corresponds to the tagged form of the "TraceEvent" procedure 304C after operation of the event tagging module 402 on a service's source code during building of the service 102. The "TraceEventTag" procedure 304D has three principle arguments ("Event ID", "Category", and "Level"). The Event ID, Category, and Level arguments have been described above with respect to the CriticalEventTag and TraceEvent procedures 304B, 304C. The TraceEventTag procedure 304D also has an optional "CompressedMessage" and other arguments which are described above with reference to the CriticalEventTag procedure 304B.

Additionally, the plurality of procedures 304 of the event generator API 302 includes five procedures 304E, 304F, 304G, 304H, 304I which are associated with transaction-related events. The first and second procedures 304E, 304F (also sometimes referred to herein respectively as the "BeginTraceInstance procedure 304E" and "BeginTraceInstanceTag procedure 304F" (i.e., which corresponds to the tagged form of the BeginTraceInstance procedure 304E)) cause the generation of a transaction begin event and the securing of a transaction instance when executed by the production server 104. The third procedure 304G (also sometimes referred to herein as the "EndTraceInstance procedure 304G") causes the generation of a transaction end event and releases the transaction instance. Each of the BeginTraceInstance procedure 304E, BeginTraceInstanceTag procedure 304F, and EndTraceInstance procedure 304G have an argument identified as "EventInstanceInfo" which includes data relevant to the transaction instance. The BeginTraceInstanceTag procedure 304F additionally has an "Event ID" argument which comprises a unique identifier generated for and assigned to the corresponding transaction instance (i.e., by the tagged event server 140) when an executable service 102 is "built" from the service's associated source code as described below.

The fourth and fifth procedures 304H, 304I associated with the generation of transaction-related events include the "TraceInstance procedure 304H" and "TraceInstanceTag procedure 304I", respectively. The TraceInstance procedure 304H allows a software developer to cause the generation of an event (i.e., similar to the general diagnostic, or trace, events generated by the TraceEvent procedure 304C described above) occurring within the context of a transaction and includes "Level", "Instance ID", and "Parent Instance ID" arguments. The Level argument, in a manner similar to the TraceEvent procedure 304C, identifies the level of granularity of the event information written to an event log data file 328 in association with the event if the event is written to an event log data file 328. The Instance ID argument identifies the transaction instance during which an event is to be generated, while the Parent Instance ID identifies the parent transaction instance, if any, of which the transaction instance (i.e., identified by the Instance ID) is a child. The TraceInstance procedure 304H also includes an optional "Message" and other optional arguments that are substantially similar to the Message and other optional arguments described above with respect to the "CriticalEvent" procedure 304A.

The TraceInstanceTag procedure 304I (i.e., the tagged form of the TraceInstance procedure 304H produced during building of a service 102), when embedded in the source code of a service 102 by a software developer, allows the developer to cause the generation of an event similar to the general diagnostic, or trace, event generated by the TraceEventTag procedure 304D, but in the context of transaction. The TraceEventTag procedure 304D includes an "Event ID" argument which comprises a unique identifier generated for and assigned to the corresponding transaction instance (i.e., by the tagged event server 140) when an executable service 102 is "built" from the service's associated source code as described below. The TraceEventTag procedure 304D also includes "Level", "Instance ID", and "Parent Instance ID" arguments which identify, respectively: the level of granularity of the event information written to an event log data file 328 in association with the event, if any; the transaction instance during which an event is to be generated; and, the parent transaction instance, if any, of which the transaction instance (i.e., identified by the Instance ID) is a child. The TraceInstanceTag procedure 304I also has an optional "Message" and other arguments similar to those described above with respect to the "CriticalEvent" procedure 304A.

The plurality of procedures 304 of the event generator API 302 include, in addition, a "ReportException" procedure 304J and a "ReportExceptionTag" procedure 304K (i.e., the tagged form of the ReportException procedure 304J produced during building of a service 102) which cause the generation of an exception event when embedded in the source code of a service 102 and executed by the production server 104 on which the service 102 resides. Both procedures 304J, 304K include an "Exception e" argument which defines a message and "to string", thereby enabling a subsequent determination of what exception type was handled and where (i.e., the file name of a source code file for the service 102 and the line number therein). Additionally, the ReportExceptionTag procedure 304K includes "Event ID" and "Category" arguments. The Event ID argument comprises a unique identifier which is generated for and assigned to the corresponding event (i.e., by the tagged event server 140) when an executable service 102 is "built" from the service's associated source code as described below. The Category argument corresponds to and identifies the source code file from which the relevant portion of the service 102 was built and is automatically generated for the source code file and assigned to the event by the tagged event server 140. The Category argument may be utilized to identify the event, or a set of related events, in an event log data file 328.

The event generator API 302 further comprises performance counter event definitions 310 corresponding to associated performance counter events which may be generated during execution of the service 102 on a production server 104 if appropriate conditions exist. The performance counter definitions 310 belong to respective performance log group(s) 312 which are defined in a header file 314 associated with the source code file of a service 102 (see FIG. 4). The performance counter definitions 310 (and, hence, the respectively associated performance counters) are incorporated into the source code file(s) of a service 102 by a reference 316 to the header file 314. Each performance counter event definition 310 is registered by adding an entry to an appropriate table and is assigned a unique "Event ID" by a software developer instead of by the tagged event server 140 during building of a service 102 as with the other types of events described above. Performance counter event definitions 310 may utilize a structure similar to one of the following exemplary structures:

{"UsersOnline", plctRawCount, "Users Online", "This counter indicates the number of users currently logged on to the service.", install group} or

{"LoginFailure", plctEventRate, "Failed Logins/sec", "This counter indicates the number of failed login requests per second.", install group}

The first argument (i.e., "UsersOnline" and "LoginFailure") in each of the above exemplary performance counter structures represents an internal name for the counter which is used by the event monitoring and logging system 100, and during the "build" process for the service 102 to create a unique identifier for the performance counter (i.e., a "Performance Counter ID") therefrom. The second argument defines the type of performance counter (i.e., "plctRawCount" and "plctEventRate"). The third argument represents a text name for the performance counter which is used for displaying counts associated with a performance counter event (i.e., "Users Online" or "Failed Logins/sec" in the exemplary performance counter structures). The fourth argument corresponds to the help text associated with the performance counter and is displayed in response to a request for help related to the performance counter. The fifth argument (i.e., the "install group") identifies the performance log group of a header referenced by the source code of the service to which the performance counter event belongs.

The event generator API 302 further comprises a plurality of procedures for generating performance counter data, including, without limitation: a "Set" procedure for setting a variable to a particular value provided as an argument; a "SetIfMax" procedure for setting a variable to a particular value provided as an argument if that value is greater than the present value of the variable; a "SetIfMin" procedure for setting a variable to a particular value provided as an argument if that value is less than the present value of the variable; and, an "Increment" procedure for incrementing a variable by one or by an increment amount provided as an argument. Each of the plurality of procedures has a unique Performance Counter ID as an argument to uniquely identify the associated performance counter event.

As briefly described above, the software components 300 of the event monitoring and logging system 100 which reside on each production server 104 also include an event router application program interface 306 which connects, via inter-process communication link 308, for the receipt of events and associated event information which are generated by the procedures 304 of the event generator API 302 when called during execution of a service 102. The event router API 306 includes a plurality of computer software procedures, or routines, which enable the receipt of such events and the routing, or directing, of such events to an appropriate event log data file 328 or to a real-time event monitor 326 in accordance with configuration information and as described in more detail below. The event router API 306 also connects, through inter-process communication link 318, to a controller 320, described below, for the receipt of configuration information therefrom which is utilized, by the event router API 306, to configure its own operation.

The procedures of the event router API 306 are operable to receive events and associated event information from the procedures 304 of the event generator API 302 and to, preferably, create two event tracing sessions based at least in part upon the configuration information received from the controller 320. One event tracing session comprises a real-time stream of events and associated event information which is output, via inter-process communication link 322, to a real-time event monitor 326 described below. The other event tracing session comprises a non-real-time stream of events and event information which is output to and stored in a plurality of event log data files 328 created by the event router API 306. The names of the event log data files 328, their locations, and the time interval utilized to switch, or redirect, the outputting of events and associated event information from one event log data file 328A to another event log data file 328B are determined based at least partially upon the configuration information received from the controller 320.

The procedures of the event router API 306 are also adapted to define one or more buffers which are used to receive events and event information from the procedures 304 of the event generator API 302. The configuration information received from the controller 320 is utilized to determine the minimum and maximum numbers of buffers to be used, the size of the buffers, and the time interval between flushes of the buffers. It should additionally be noted that operation of the procedures of the event router API 306 (and, hence, the routing of events and related event data to the real-time event monitor 326 and/or to event log data files 328) may be turned off and on by instructions received from the controller 320.

When the production server 104 begins to execute the procedures of the event router API 306, it configures the procedures using configuration information received from the controller 320. Once initialized, the procedures of the event router API 306 create an event log data file 328A and begin receiving events and associated event information from the procedures of the event generator API 302. The received events and associated event information are stored temporarily in the buffers. Then, upon expiration of the pre-configured time interval between buffer flushes or upon a buffer becoming full, the procedures of the event router API 306 cause the event and associated event information to be communicated from the buffers to the real-time monitor 326 and/or to an event log data file 328A for storage therein. The procedures of the event router API 306 subsequently determine whether the time interval for switching between event log data files 328 has passed. If so, a new event log data file 328B is created using the received configuration information and made ready for the receipt of event and associated event information upon the next buffer flush. The previous event log data file 328A is sent, via communication link 112, to the processing server 110 which has been previously assigned to operate with the production server 104. Then, the above steps are repeated until operation of the event router API 306 is stopped, if necessary, by the controller 320.

As described briefly above, the software components 300 of the event monitoring and logging system 100 which reside on a production server 104 also comprise a controller 320 which connects for communication with the event router API 306 and provides the event router API 306 with configuration and control information. The controller 320 includes a plurality of computer software instructions, which when executed by a production server 104, cause the production server 104 to control operation of the event router API 306. The software components 300 additionally comprise a shared memory area 330 of the production server's system memory 130 (also sometimes referred to herein as the "controller parameters shared memory 330") which stores controller configuration parameters. The controller parameters shared memory 330 is accessible by the administrator system 114, via communication links 120, for storage of the controller configuration parameters in the controller parameters shared memory 330. Because the administrator system 114 may update the controller configuration parameters stored in the controller parameters shared memory 330 at any time and because the controller 320 periodically determines whether or not any such update has occurred (i.e., and if so, reads and begins to use the updated controller configuration parameters), operation of the controller 320 and the event router API 306 may also be changed at any time, even during execution of the controller 320 and the event router API 306.

The controller configuration parameters, preferably, include data which defines: the minimum and maximum number of buffers to be used by the event router API 306 while buffering event and associated event information received from the event generator API 302; the size of such buffers; and, the time interval between buffer flushes. The controller configuration parameters also, preferably, include information defining: the storage location of the event log data files 328; the names of the event log data files 328 based on the production server's name and the logging time; and, the time interval to be used by the event router API 302 to determine when to switch, or redirect, its data file output from one event log data file 328 to another event log data file 328. Additionally, the controller configuration parameters, preferably, include data informing the controller 320 as to whether it is to allow operation of the event router API 304 to continue or to stop operation of the event router API 304.

With respect to operation of the controller 320, execution of the controller 320 by a production server 104 begins during startup of the production server 104. Once its execution has begun, the controller 320 reads the controller configuration parameters from the controller parameters shared memory 330, processes the controller configuration parameters to produce configuration information for the event router API 302, and communicates the produced configuration information, via inter-process communication link 318, to the event router API 302 for use by the event router API 302. Then, the controller 320 instructs the event router API 302 to create two event tracing sessions (i.e., a real-time data stream of events and associated event information for the real-time event monitor 326, and a data stream of events and associated event information for storage in event log data files 328 and subsequent monitoring by a near-real-time event monitor 814 described below). The controller 320 then reviews the controller configuration parameters stored in the controller parameters shared memory 330 to determine whether or not they have been changed, or updated, by the administrator system 114. If so, the controller 320 determines whether the controller configuration parameters have been changed to indicate that operation of the event router API 302 is to be stopped. If such operation is to be stopped, the controller 320 causes the event router API 302 to cease operating. Otherwise, the controller 320 processes the updated controller configuration parameters to produce updated configuration information for use by the event router API 302 and communicates the updated configuration information to the event router API 302 via inter-process communication link 318. If not, the controller 320 loops back to once again review the controller configuration parameters stored in the controller parameters shared memory 330.

The software components 300 of the event monitoring and logging system 100 which reside on each production server 104 additionally comprise, as briefly described above, a real-time event monitor 326 which monitors events generated by the event generator API 302 and received from the event router API 306 in a data stream communicated via inter-process communication link 324. The real-time event monitor 326 comprises a plurality of computer software instructions, which when executed by a production server 104, causes the production server 104 to monitor such generated events in accordance with a plurality of thresholds, to generate alerts when one or more of the thresholds are exceeded, and to communicate the alerts to the data center system 116, via communication link 122, so that data center personnel may attempt diagnose and resolve the conditions causing the alerts. Preferably, the generated events monitored by the real-time event monitor 326 include those generated events having a threshold related to a relatively short period of time, whereas the generated events monitored by the near-real-time event monitor 814, described below, include those generated events having a threshold related to relatively long period of time.

The real-time event monitor 326 is configured for operation through use of configuration information stored in a monitor configuration data file 334, preferably, by a system administrator or other appropriate personnel. The configuration information of the monitor configuration data file 334 is read and processed by the real-time event monitor 326 whenever the real-time monitor 326 is started upon startup of a production server 104 or upon restart after having been previously shut down. The configuration information of the monitor configuration data file 326 defines the events, event types, event categories, and levels of events that are to be monitored by the real-time event monitor 326. The configuration information also, generally, defines one or more thresholds which may be set to establish criteria governing the generation of alerts to the data center system 116. For example and not limitation, a threshold might cause the generation of an alert if a performance counter event related to available disk drive space has been generated and the value of the performance counter is less than a particular threshold value. Preferably, the configuration information of the monitor configuration data file 334 is structured in XML format (see FIG. 5).

The real-time event monitor 326 and monitor configuration data file 334 support the setting of four basic types of thresholds. The first type of thresholds causes the real-time event monitor 326 to immediately send out an alert to the data center system 116 when it detects (i) a particular generated event (i.e., an event having an associated "Event ID" equal to a particular value), or (ii) one or more generated events having an associated "Level" greater than or less than a particular value. Such thresholds enable a system administrator to configure the real-time event monitor 326, for example, to look for a particular event which is known to indicate the existence of a serious problem with a service 102.

The second type of thresholds causes the real-time event monitor 326 to send out an alert to the data center system 116 when it detects (i) a number of occurrences of a particular generated event within a certain time interval, or (ii) a number of occurrences of generated events having a particular event level within a certain time interval. Thus, the second type of threshold requires two threshold parameters: the number of occurrences (i.e., whether it be related to a particular generated event or generated events of a particular level), and the timer interval during which occurrences of the particular generated event or generated events of the particular level are to be counted by the real-time event monitor 326. An exemplary threshold of the second type of thresholds might cause the real-time event monitor 326 to generate and communicate an alert to the data center system 116 if an event having an "Event ID" of 1234 happens 1,000 times in the last five minutes. Another exemplary threshold of the second type of thresholds might cause the real-time event monitor 326 to generate and communicate an alert to the data center system 116 if any ship assert event (i.e., an event having a "Level" of 7) occurs more than 100 times in the last five minutes.

The third type of thresholds relate to the performance of transactions including multiple stages and causes the real-time event monitor 326 to send out an alert to the data center system 116 when it detects: (i) a number of occurrences of a particular transaction within a particular time period that take more than a certain amount of time to complete; (ii) a percentage of occurrences of a particular transaction occurring within a particular time period that take more than a certain amount of time to complete; (iii) an average time to complete a particular transaction that is greater or less than a certain amount of time; and, (iv) a number of occurrences of a particular transaction within a particular time period that have a particular generated event or generated events having a particular level occur during the life time of the transaction. Exemplary thresholds of the third type of thresholds in forms (i), (ii), (iii), and (iv) might cause the real-time event monitor 326 to generate and communicate an alert to the data center system 116, respectively, if: (i) more than 1,000 occurrences of transaction 1234 (i.e., a transaction having an "Instance ID" equal to 1234) within the last five minutes take more then ten seconds to complete; (ii) five percent of the occurrences of transaction 1234 (i.e., a transaction having an "Instance ID" equal to 1234) within the last five minutes take more than ten seconds to complete; (iii) the average time to complete transaction 1234 (i.e., a transaction having an "Instance ID" equal to 1234) with the last five minutes is less than ten seconds; and, (iv) one hundred occurrences of transaction 1234 (i.e., a transaction having an "Instance ID" equal to 1234) within the last five minutes have an event 5678 (i.e., an event having an "Event ID" equal to 5678) occur during the life time of the transaction.

A fourth type of thresholds causes the real-time event monitor 326 to send out an alert to the data center system 116 when it detects a number of occurrences of a first generated event within a certain time interval that is greater than a number of occurrences of a second generated event with the same time interval by a particular percentage. Thus, the fourth type of threshold requires two threshold parameters: the number of occurrences of a first generated event, the number of occurrences of a second generated event, the timer interval during which occurrences of the generated events are to be counted by the real-time event monitor 326, and the percentage by which the number of occurrences of the first generated event is greater than the number of occurrences of the second generated event. An exemplary threshold of the fourth type of thresholds might cause the real-time event monitor 326 to generate and communicate an alert to the data center system 116 if a first event having an "Event ID" of 1234 happens more than ten percent (10%) as often as a second event having an "Event ID" of 5678 in the last five minutes.

It should be noted that thresholds are developed by a system administrator, data center personnel, developers, or other personnel with respect, generally, to a single service 102. Therefore, a monitor configuration data file 334 residing on a particular production server 104 is unique to that production server 104 and to the service 102 executed thereon, and a monitor configuration data file 334 residing on a different production server 104 may, most likely, include different configuration information therein.

As described above, an alert is generated by the real-time event monitor 326 when a threshold is exceeded and is communicated to the data center system 116. The alert comprises a plurality of data elements (also sometimes referred to herein as "alert data"), including, without limitation: (i) a single, designated event identifier used by each alert which identifies the alert as being generated by the real-time event monitor 326 (i.e., which is necessary since the data center system 116 may receive other alerts from a near-real-time event monitor 814 on the same production server 104, from a real-time event monitor 326 residing on a different production server 104, from a non-real-time event monitor 814 residing on a different production server 104, or from other sources outside of the event monitoring and logging system 100); an alert type indicator which identifies the alert as an error; a source identifier which identifies the source of the underlying generated event; the name of the production server 104 on which the underlying generated event occurred; and, a string including the threshold associated with the underlying generated event, the current value(s) of the parameter(s) compared by the threshold, the Event ID(s) associated with the underlying generated event(s), and the level of the underlying generated event(s).

Figure 4:
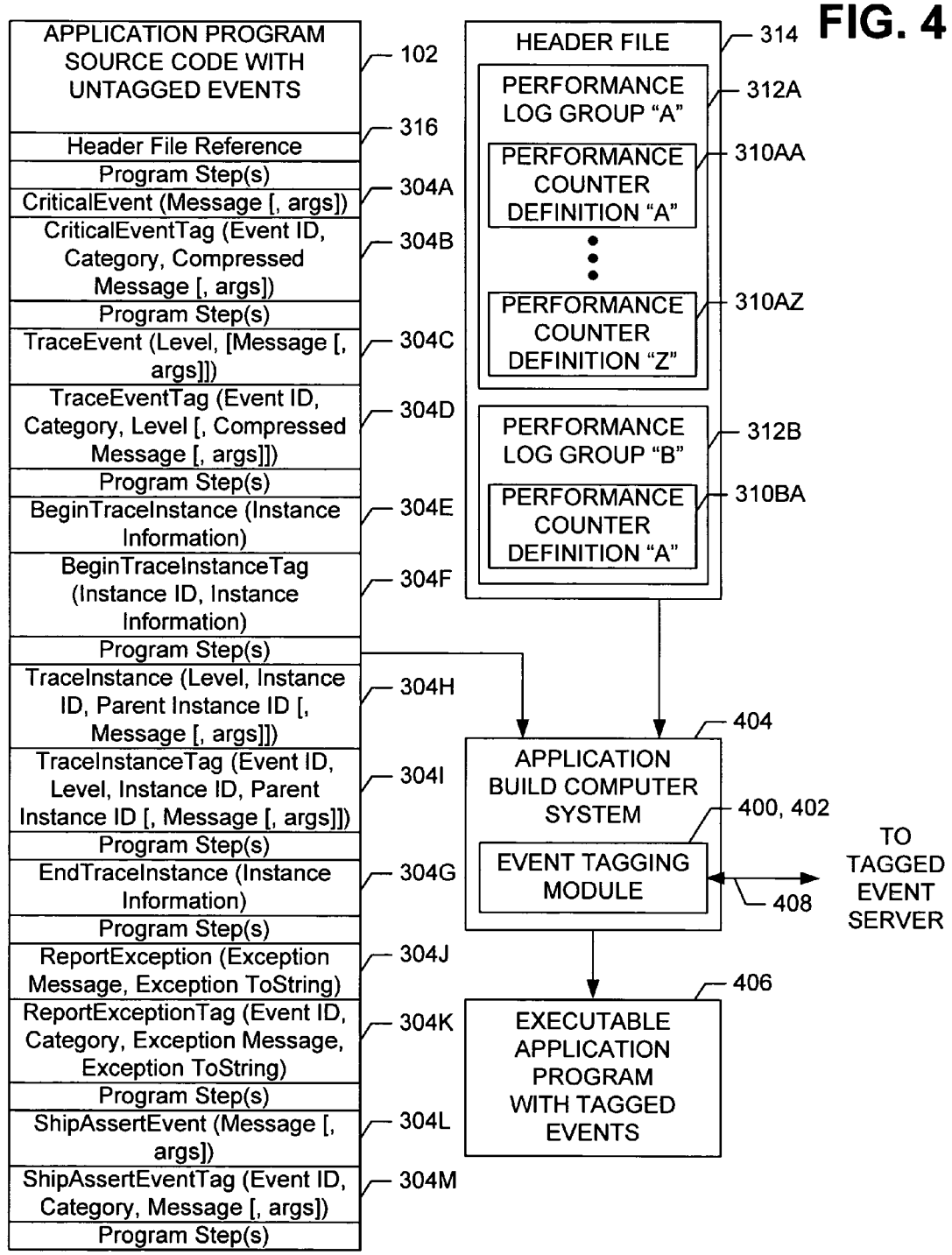
FIG. 4 displays a block diagram representation of an instrumented source code file and of other software components of the event monitoring and logging system related to the processing thereof, in accordance with the embodiment of the present invention.

FIG. 4 displays a block diagram representation, according the present invention, of a source code file associated with a service 102 which includes embedded calls to procedures 304 of an event generator API 302 (in both untagged and tagged forms) and of other software components 400 of the event monitoring and logging system 100 which relate to the tagging of embedded event calls. The source code file, the calls to procedures 304 embedded therein, and header file 314 of FIG. 4 have been described in detail above with reference to FIG. 3 and are, therefore, not described further with reference to FIG. 4. In addition to the service source code file and header file 314, the event monitoring and logging system 100 further comprises an event tagging module 402 described below.

The event tagging module 402 comprises a plurality of computer software instructions residing on a build computer system 404 (e.g., a computer system similar to computer system 210 of FIG. 2 which "builds", or creates, an executable form 406 of the service 102 from the source code file(s) associated with the service 102), which when executed by the build computer system 404 during "building" of an executable form 406 of the service 102, cause the generation of tag entries in the tagged event database of the tagged event server 140 for each call to a procedure 304 embedded in the service source code file(s) and the updating of the executable form 406 of the service 102 to include calls to procedures 304 (i.e., in tagged form) having unique identifiers (i.e., Event IDs) corresponding to the respective tag entries made in the tagged event database.

In operation, the event tagging module 402 causes the application build computer system 404 to scan the source code file(s) associated with the service 102 for the presence of calls to procedures 304 or of a reference to a header file 314 in the source code file(s). Upon discovering such calls or reference, the event tagging module 402 causes the application build computer system 404 to communicate information associated with the embedded calls to procedures 304 (and, hence, associated with the events or transaction instances corresponding to the calls) or to the performance counter events definitions 310 in the header file 314 (and, hence, associated with the performance counter events corresponding to the definitions 310) to the tagged event server 140 via communication link 408. Such information includes, without limitation, event messages which may be written to a report 900, 1000, 1200, 1300, 1400 related to tagged and/or generated events. The tagged event server 140 generates unique tag identifiers for each call to a procedure 304 which correspond to Event IDs or Instance IDs associated with the embedded events or transaction instances as appropriate, and creates and stores respective tag entries in the tagged event database residing on the tagged event server 140 for each call to a procedure 304 or each definition 310. Then, the event tagging module 402 receives the tag identifiers from the tag event server 140 and inserts them into the appropriate respective calls to procedures 304 in non-tagged form to produce tagged forms thereof, thereby enabling events generated during execution of the service 102 to be associated with details therefor in the tagged event database. Next, the event tagging module 402 assigns a unique category to each source code file from which a service 102 is "built" and creates a list of categories which are substituted into the respective "Category" arguments of the tagged forms of the event generation procedures 304 described above. The event tagging module 402 then ceases operation.

It should be understood from the above description that most thresholds are useful only when they are associated with a particular time period. By counting or calculating the number of occurrences of generated events during a particular time period, the real-time event monitor 326 may determine whether thresholds are exceeded or not. However, because it is virtually impossible to perform such calculations continuously for every generated event, it is necessary for the real-time event monitor 326 to aggregate previously received data associated with generated events upon the passage of a certain amount of time (the "aggregation period"). Otherwise, the real-time event monitor 326 must record and consider data associated with all previously received generated events. Preferably, the aggregation period is one minute. Thus, because the received data associated with generated events is aggregated upon the passage of each aggregation period, the smallest amount of time that may be employed in a threshold is the aggregation period and the threshold may increase only in intervals equal to the aggregation period. Also, to improve performance of the real-time event monitor 326, each threshold is limited with respect to the maximum amount of time it may employ in relation to generated events (the "maximum threshold period"). Preferably, the maximum threshold period is not longer than the time interval used by the real-time event monitor 326 to determine when to switch to a new event data log file 328 for receipt of generated event information, and not longer than thirty minutes.

Figure 6:
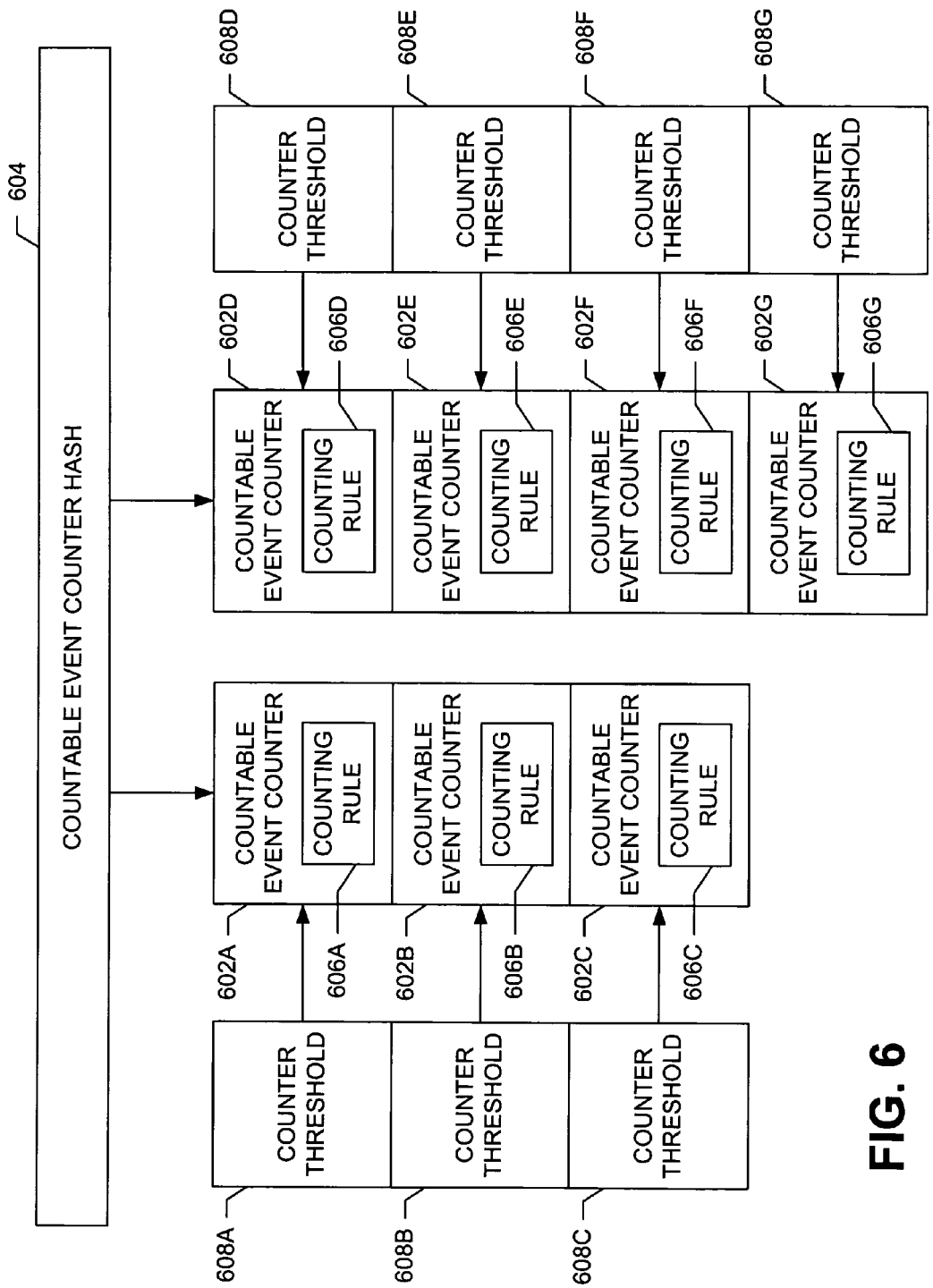
FIG. 6 displays a block diagram representation of a real-time event monitor of the event monitoring and logging system in accordance with the embodiment of the present invention.

FIG. 6 displays a block diagram representation of the real-time event monitor 326 in accordance with the embodiment of the present invention described herein. The real-time event monitor 326 comprises a plurality of countable event counters 602 which may be thought of as "buckets" that record the number of occurrences of a specific countable event which have occurred within the last "n" milliseconds. Each countable event counter 602 includes "m" segments (also sometimes referred to herein as "time segments") which correspond to sub-counters, or sub-buckets, into which events are recorded during operation of the real-time event monitor 326. The number of sub-counters is determined for each countable event counter 602 by the real-time event monitor 326, during startup, through the use of configuration information present in and read from the monitor configuration data file 334 (see FIG. 5). Such configuration information includes a maximum measurement span parameter and a counter time divisor parameter. The maximum measurement span parameter identifies the maximum length of time for which a corresponding countable event counter 602 is to record the occurrences of a specific countable event. The countable time divisor parameter identifies the number of segments (i.e., "m"), or sub-counters, for the corresponding countable event counter. The real-time event monitor 326 determines the duration of each time segment (also sometimes referred to herein as "segment length") associated with a sub-counter by dividing the maximum measurement span parameter by the countable time divisor parameter.

A segment list queue maintains a list of the segments which may be iterated over. Preferably, the segment list queue has a fixed length. In use, when a new value is to be pushed into the list, the last node in the list is moved up to the "front" and given a new value. The second-to-last node is then made into the last node.

Each countable event counter 602 has an associated data structure comprising: a current segment value which stores the number of occurrences of a generated event which meet the logical conditions of an associated counting rule; a current segment start time corresponding to the starting time for the current segment (preferably, in milliseconds relative to the system clock); a current segment end time corresponding to the ending time for the current segment (preferably, in milliseconds relative to the system clock); a last event received time which identifies the receipt time of the last generated event meeting the logical conditions of an associated counting rule (preferably, as indicated by the system clock); a total time span for which the countable event counter 602 is to count occurrences of a generated event which meet the logical conditions of an associated counting rule (i.e., the total time that the segment list is keeping track of); a segment length defining the duration of each time segment of the segment list (preferably, in milliseconds); and, a segment list pointer which points to the segment list for the countable event counter 602.

The countable events which are recorded by a countable event counter 602 include either an occurrence of a specific generated event (i.e., a generated event having a particular Event ID) to which no associated counting rule (described below) is associated or an occurrence of a specific generated event (i.e., a generated event having a particular Event ID) where the value of particular data element associated with the specific generated event matches an associated counting rule. Such particular data element often includes, for a transaction-related event, the amount of time required for a transaction to complete (also sometimes referred to herein as the "transaction time"). Exemplary countable events include, but are not limited to: (i) a generated event having an Event ID equal to 1234; (ii) a generated event having an Event ID equal to 1234 where the transaction time is 500 milliseconds and an associated counting rule has a threshold with respect to the transaction time set at greater than 400 milliseconds; and, (iii) a generated event having an Event ID equal to 1234 where the transaction time is 100 milliseconds and an associated counting rule has a threshold with respect to the transaction time set at less than 200 milliseconds.

Each counting rule 606, specified in the monitor configuration data file 334, comprises a data structure defining a logical relationship between a threshold value and the value of a particular data element found in the event information associated with each event. The data structure comprises a logical operator for use in comparing the threshold value and the value of the particular data element, a threshold value, a pointer (i.e., an offset from the start of a data structure storing the event information) to the location of the particular data element of such event information, and a length of time for which countable events are to be recorded by a corresponding countable event counter 602. For example, if a particular data element of the event information associated with an event is located at 16 bytes from the start of a data structure storing the event information and if the particular data element is to be logically compared with a threshold value of 40 to determine whether it is greater than 40 and if an associated countable event counter 602 is to record the number of such occurrences for a period of 2000 milliseconds, a corresponding counting rule 606 includes a logical operator identifier associated with the "greater than" logical operator, a threshold value of 40, an offset of 16 bytes, and count duration of 2000 milliseconds.

The real-time event monitor 326 also comprises a countable event counter hash data structure 604 which enables the location of a specific countable event counter 602 stored in memory. The hash data structure 604 is keyed on the Event ID of a respective generated event associated with a countable event counter 602. Because multiple countable event counters 602 may be associated with a single generated event (i.e., as there may be multiple counting rules and counting events associated with a single generated event), calls to locate the countable event counters associated with a single generated event return an array of pointers to all of the countable event counters identified in the hash data structure 604 for the single generated event.

As briefly described above, thresholds 608 (also sometimes referred to herein as "counter thresholds 608") are employed by the event monitoring and logging system 100, and by the real-time event monitor 326 thereof, to determine whether an alert should be generated and communicated to the data center system 116. Each counter threshold 608 may be associated with one or more countable event counters 602 and comprises a counter threshold data structure which stores data defining when the associated countable event counter 602 is in a state for which an alert should be generated and communicated to the data center system 116. More specifically, the counter threshold data structure stores for each counter threshold: a counting rule identifier which uniquely identifies the counting rule 606 and the associated countable event counter 602; a logical operator identifier which identifies an operator (i.e., greater than or less than) to be employed during evaluation of the threshold 608 during monitoring; a count; a length of time over which to consider the number of occurrences of a generated event to which the threshold 608 applies (the "measurement time span"); and, a pointer to the associated countable event counter 602. Using the data stored in the counter threshold data structure, the real-time event monitor 326 monitors the counter thresholds 608 in relation to the associated countable event counters 602 on a periodic basis in order to make such a determination. The time interval between checks of the countable event counters 602 (also sometimes referred to herein as the "counter threshold check interval") for such monitoring comprises a configuration parameter stored in the monitor configuration data file 334.

In order for the real-time event monitor 326 to monitor generated events and generate alerts when appropriate, the real-time event monitor 326 must be configured for operation. Thus, the real-time event monitor 326, upon startup or a restart thereof, reads configuration information from the monitor configuration data file 334 (see FIG. 5) and validates certain read configuration parameters against predefined ranges for such configuration parameters to insure that the configuration parameters present in the monitor configuration data file 334 are within such ranges. Next, the real-time event monitor 326 iterates through the list of counting thresholds 608 and for each counting threshold 608, using the rule identifier associated therewith, compares the data of the counting threshold 608 and identified counting rule 606 and performs necessary validation. Once validation is complete, the counter threshold is inserted into an array of counter thresholds 608 and the associated counting rule 606 is associated with a countable event counter 602. Next, an entry for such countable event counter 602 is made in the countable event counter hash data structure 604. Then, a pointer is stored in the counter threshold data structure for the countable event counter 602.

Figure 7A:
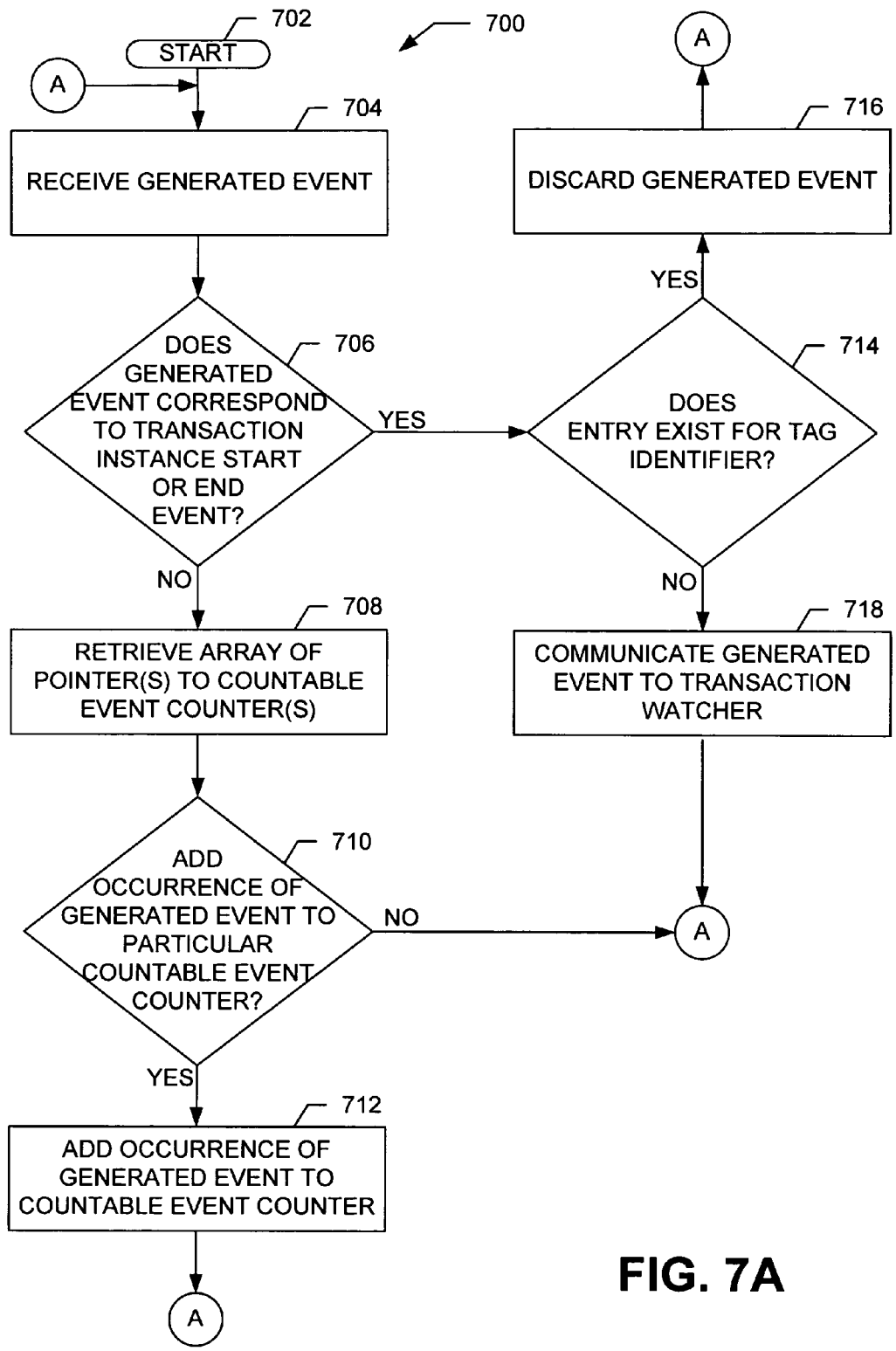
FIG. 7A displays a flowchart representation of a method of monitoring generated events in accordance with the embodiment of the present invention.

Once appropriately configured, the real-time event monitor 326 begins monitoring generated events and, as appropriate, generating alerts and communicating such alerts to the data center system 116. FIG. 7A displays a flowchart representation of a method 700 of monitoring generated events, in accordance with the embodiment of the present invention described herein, which is employed by the real-time event monitor 326. After starting at step 702, the real-time event monitor 326 receives, at step 704, a generated event having an associated Event ID. The generated event may be received from a service 102 executing on a production server 104 or from a transaction watcher as described below. The real-time event monitor 326 then examines the Event ID, at step 706, to determine whether the generated event corresponds to a transaction instance start or end event (i.e., two specific Event IDs are reserved for the start and end of a transaction instance). If so, the real-time event monitor 326 branches to step 714 of method 700 to handle the generated event as a transaction instance as described below. If not, the real-time event monitor 326 continues operation in accordance with method 700 at step 708 where it retrieves an array of pointer(s) to countable event counter(s) 602 which are associated with the Event ID of the generated event. After retrieving the array of pointer(s), the real-time event monitor 326 iterates, at step 710, through the countable event counter(s) 602 designated by the pointer(s) to determine whether an occurrence of the generated event should be added to the countable event counter(s) 602 (i.e., by determining whether the generated event meets the criteria established by the respective counting rule(s) 606 associated with the countable event counter(s) 602).

If the real-time event monitor 326 determines, at step 710, that an occurrence of the generated event should be added to a particular countable event counter 602 pointed by the retrieved array of pointers, the real-time event monitor 326 adds, at step 712, an occurrence of the generated event to the particular countable event counter 602. To do so, the real-time event monitor 326 first determines whether the current system time is greater than the current segment end time. If so, the real-time event monitor 326 pushes the value of the current segment value onto the segment list and ascertains whether the difference between the current segment end time and the current time is greater than the segment length. If the difference is greater than the segment length, the real-time event monitor 326 divides the difference by the segment length to identify the number of empty values to be pushed onto the segment list. Then, the real-time event monitor 326 pushes such number of empty values onto the segment list. If the current system time is less than the current segment end time, then the real-time event monitor 326 increments the current segment value. Subsequently, the real-time event monitor 326 sets the last event received time equal to the current system time. The real-time event monitor 326 then loops back to step 704 to receive another generated event. If, at step 710, the real-time event monitor 326 determines that an occurrence of the generated event should not be added to a particular countable event counter 602 pointed to by the retrieved array of pointers, the real-time event monitor 326 branches back to step 704 of method 700 to receive another generated event.

At step 714, the real-time event monitor 326 uses the tag identifier present in the event information associated with the generated event to determine whether an entry exists for the tag identifier by looking up the generated event in the countable event counter hash data structure 604. If not, the real-time event monitor 326 discards the generated event at step 716, performs no further processing with respect to the generated event, and returns to step 704 to receive another generated event. If the real-time event monitor 326 determines, at step 714, that such an entry exists, the real-time event monitor 326 communicates the generated event to a transaction watcher, at step 718, which tracks all transaction instances that have been started, but not yet completed. It should be noted that when a transaction instance completes, the transaction watcher generates an event and associated event information and communicates the generated event for processing in accordance with the present method 700 starting at step 702 hereof.

Figure 7B:
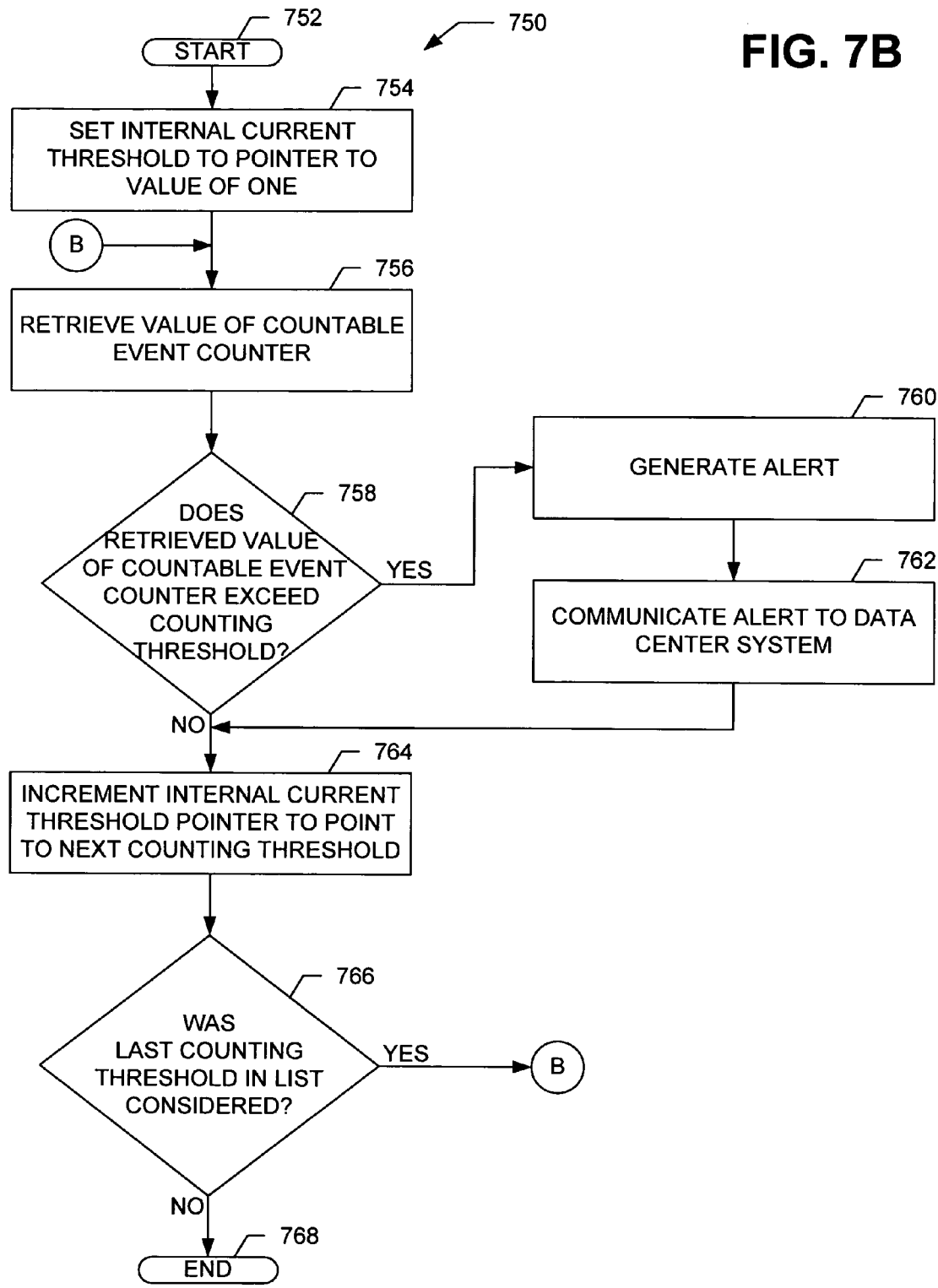
FIG. 7B displays a flowchart representation of a method for generating alerts in accordance with the embodiment of the present invention.

FIG. 7B displays a flowchart representation of a method 750 for generating alerts, in accordance with the embodiment of the present invention described herein, which is employed by the real-time event monitor 326. After starting at step 752, the real-time event monitor 326 sets, at step 754, an internal current threshold pointer to a value of one to point to the first counting threshold 608 in a list of counting thresholds 608. Next, at step 756, the real-time event monitor 326 retrieves the value of the countable event counter 602 associated with the counting threshold 608 identified by the current threshold pointer from the list of counting thresholds 608. Then, at step 758, the real-time event monitor 326 determines whether the retrieved value of the countable event counter 602 exceeds the criteria identified in the counting threshold 608 identified by the current threshold pointer. If not, the real-time event monitor 326 branches to step 764 described below. If so, the real-time event monitor 326 continues operation at step 760 of method 750 where it generates an alert in the form described herein. Next, at step 762, the real-time event monitor 326 communicates the alert to the data center system 116 via communication link 122.

At step 764, the real-time event monitor 326 increments the internal current threshold pointer to point to the next counting threshold 608, if any, in the list of counting thresholds 608. Then, at step 766, the real-time event monitor 326 determines whether the last counting threshold 608 in the list of counting thresholds 608 has been considered. If so, the real-time event monitor 326 loops back to step 756 of method 750 to retrieve the value of the countable event counter 602 associated with the counting threshold 608 identified by the current threshold pointer from the list of counting thresholds 608 and continues operation as described above. If, at step 766, the real-time event monitor 326 determines that no more counting thresholds 608 are present in the list of counting thresholds 608 for consideration, it ceases operation in accordance with method 750 at step 768.

It should be noted that the real-time event monitor 326 does not execute in accordance with method 750 on a continual basis. Instead, the real-time event monitor 326 may enter a hibernation state upon completion of operation according to method 750 and then awaken after the passage of pre-determined period of time (sometimes referred to herein as a "monitoring interval") to again consider the counting thresholds 608 to determine whether alerts must be generated and communicated to the data center system 116. The monitoring interval comprises a configuration parameter stored in the monitor configuration data file 334 which is read in by the real-time event monitor 326 and used for configuration thereof as described above.

FIG. 8 displays a plurality of software components 800 of each processing server 110 according to the embodiment of the present invention described herein. The software components 800 comprise an event log data file collector computer software program 802 and a collector parameters shared memory 804. The event log data file collector computer software program 802 (also sometimes referred to herein as the "event log data file collector 802") comprises a plurality of computer software instructions which, when executed at a pre-determined time interval by the processing unit of the processing server 110, is operable to cause the processing server 110 to retrieve, via a communication link 112, event log data file(s) 328 dropped, or communicated, by each production server 104 with which the processing server 110 is assigned to operate. The event log data file collector 802 is also operable, when executed, to store the retrieved event log data file(s) 328, on the processing server 110, as collected event log file(s) 804. The pre-determined time interval between each retrieval is most often set to coincide with the dropping of event log data files 328 by the assigned production servers 104. Preferably, the pre-determined time interval between each retrieval is adjustable and/or configurable via one or more configuration parameter(s) which may be written to and stored in a collector parameters shared memory 806 by the administrator system 114 via communication link 120. It should be noted that in order for the event log data file collector 802 to execute only upon the passing of a pre-determined time interval and then for only as long as necessary to retrieve and store the appropriate event log data files 328, the event log data file collector 802 may hibernate, or have its execution suspended by the processing server's operating system, during the pre-determined time interval and be reawakened for execution upon the passing of the pre-determined time interval.

The collector parameters shared memory 806, preferably, comprises a segment of memory in the processing server's system memory 230 which may be written to by the administrator system 114 and read from periodically by the event log data file collector 802 in order for the event log data file collector 802 to determine whether any configuration parameters necessary for its operation have been updated or changed by a system administrator via the administrator system 114. Because a system administrator may change the configuration parameters stored in the collector parameters shared memory 806 at any time (even during operation of the processing server 110) and because the operation of the event log data file collector 802 is at least partially dependent upon such configuration parameters to define how it operates, the system administrator may change the manner in which the event log data file collector 802 operates, at any time, by changing the configuration parameters stored in the collector parameters shared memory 806.

In addition to storing the pre-determined interval employed by the event log data file collector 802 to awaken and cause the processing server 110 to collect event log data files 328 dropped by one or more production servers 104, the collector parameters shared memory 806 stores configuration parameters identifying the production servers 104 from which the processing server 110, acting under the control of the event log data file collector 802, is to collect dropped event log data files 328. In a manner similar to that employed with respect to the pre-determined interval, the configuration parameters identifying such production servers 104 may also be changed at any time by a system administrator, thereby allowing the system administrator to reassign a production server 104 to or away from the processing server 110.

The software components 800 of each processing server 110 also comprise an event log data file processor computer software program 808 and a processor parameters shared memory 810. The event log data file processor computer software program 808 (also sometimes referred to herein as the "event log data file processor 808") comprises a plurality of computer software instructions which, when executed by the processing unit of a processing server 110, is operable to cause the processing server 110 to process each of the collected event log data files 804 and to produce a single processed event log data file 812 corresponding to the collected event log data files 804. During such processing, the processing server 110 reads events and associated event information therefor (i.e., which is stored, preferably, in a binary format) from each collected event log data file 328, converts the events and associated event information into a text format for subsequent aggregation with the events and associated event information of other collected event log data files 804, and stores the events and associated event information in textual form in a processed event log data file 812.

Also during such processing, the processing server 110 may add other appropriate information to the processed event log data file 812 including, for example and not limitation, name information identifying the production server 104 which dropped the corresponding collected event log data file 804. Once such processing is complete with respect to the collected event log data files 804 and the corresponding processed event log data file 812, the event log data file processor 808 additionally causes the processing server 110 to communicate, via communication link 136, the processed event log data file 812 to database server 128 and, preferably, to a pre-determined folder of the database server's database. The event log data file processor 808 further causes the processing server 110 to communicate the collected event log data files 804, through communication link 130, to the archive server 126.

The processor parameters shared memory 810, in a manner similar to the collector parameters shared memory 806, preferably, comprises a segment of memory in the processing server's system memory 230 which may be written to by the administrator system 114 through communication link 120 and read from periodically by the event log data file processor 808 in order for the event log data file processor 808 to determine whether any configuration parameters necessary for its operation have been updated or changed by a system administrator via the administrator system 114. The processor parameters shared memory 810, preferably, stores one or more configuration parameters used by the event log data file processor 808 and identifying the archive server folder to which the processing server 110, operating as directed by the event log data file processor 808, is to move the processed event log data file 812. Because a system administrator may change the configuration parameters stored in the processor parameters shared memory 810 at any time (even during operation of the processing server 110) and because the operation of the event log data file processor 808 is at least partially dependent upon such configuration parameters to define how it operates, the system administrator may change the manner in which the event log data file processor 808 operates, at any time, by changing the configuration parameters stored in the processor parameters shared memory 810.

The software components 800 of a processing server 110 additionally include a near-real-time event monitor 814 and a monitor configuration data file 816. The near-real-time event monitor 814 comprises a plurality of computer software instructions which are executable by the processing server's processing unit to cause the processing server 110, upon execution of the instructions, to read and monitor the collected event log data files 804 for the presence of generated events therein which are identified in thresholds defined in the monitor configuration data file 816. To the extent that such thresholds do not identify a particular generated event, the non-real-time event monitor 814 does not act upon the particular generated event. To the extent that such thresholds identify a particular generated event and one or more of such thresholds are exceeded, the non-real-time event monitor 814 generates an alert(s) and communicates such alert(s) to the data center system 116 via communication link 124.

It should be noted that the near-real-time event monitor 814 has substantially the same structure and operates in substantially the same manner as the real-time event monitor 326 described above. However, alerts generated and communicated by the near-real-time event monitor 814 may additionally include the name(s) or identifier(s) of the production server(s) 104 on which the generated event(s) that caused the alert(s) occurred since the processing server 110 may receive collected event log data files 804 containing generated events from one or more production servers 104. It should also be noted that because the near-real-time event monitor 814 receives its input from collected event log data files 804, the near-real-time event monitor 814 may operate periodically or hibernate and be awakened for operation when collected event log data files 804 are available for monitoring and analysis.

The monitor configuration data file 816 includes thresholds and other configuration information for use by the near-real-time event monitor 814. The format of the thresholds and configuration information is substantially the same as that of the thresholds and configuration information described above with respect to the monitor configuration data file 334 used by the real-time event monitor 326. It should be noted, however, that the thresholds identified in monitor configuration data file 816 are, generally, different than those identified in monitor configuration data file 334 because certain generated events do not require real-time monitoring, while other generated events (such as, for example, generated events having a high level) require real-time monitoring. Thus, by storing thresholds in monitor configuration data file 815 which are different than those thresholds stored in monitor configuration data file 334, the monitoring workload for generated events may be divided appropriately between the near-real-time event monitor 814 and the real-time event monitor 326.

A system administrator or other person may revise the thresholds and/or other configuration information stored in the monitor configuration data file 816 and provide an updated monitor configuration data file 816 to the processing server 110 at any time via communication link 120. Thus, the near-real-time event monitor 814 reads the thresholds and other configuration information from the monitor configuration data file 816 periodically to determine whether such thresholds and other configuration have been changed by a system administrator. If it is determined that changes have been made, the near-real-time event monitor 814 reconfigures itself using the thresholds and other configuration information present in the revised monitor configuration data file 816. Because the monitor configuration data file 816 may be revised at any time and because the operation of the near-real-time event monitor 814 depends at least in part upon the thresholds and/or other configuration information present in the monitor configuration data file 816, operation of the near-real-time event monitor 814 may be modified at any time by the provision of an updated monitor configuration data file 816 to the processing server 110.

As described briefly above, the web server 132 is operable to generate a plurality of reports related to the usage of the event monitoring and logging system 100 and the occurrence of generated events, and to provide such reports to non-data center personnel computer systems 142 via communication link 146 and, hence, to non-data center personnel. Some of the reports include aggregated event and associated event information stored in database server 128 (i.e., which was aggregated from event data generated during operation of service(s) 102 on the production server(s) 104) and accessed by the issuance of appropriate commands to the database server 128 via communication link 138. To the extent that some reports may require detailed descriptions of each event as embedded in the source code of services 102 by software developers (i.e., which was extracted from the procedure 304 arguments or generated by the event tagging module 402 and stored in a database of the tagged event server 140 when the services 102 were "built"), the web server 132 accesses the tagged event database residing on the tagged event server 140 through communication link 144 and retrieves appropriate information. The web server 132 makes such reports accessible through a web-based, user interface having a tab for reports which displays report names associated with the reports and enables the selection of a particular report for generation and viewing.

The reports, preferably, include two primary types of reports. The first type of reports, sometimes referred to herein as "tagging data reports", include information only from the tagged event database and display overall statistics of the software developers' implementation of the procedures 304 of the event generator API 302 in the source code for the services 102. Such reports may be helpful in determining how and the extent to which the event monitoring and logging system 100 is being used by software developers, and to identify events which have been incorporated into the source code of services 102 for inclusion, along with details regarding each such event, in troubleshooting guides or other operations-related documents. The second type of reports, sometimes referred to herein as "event data reports", include event and associated event information stored in a database of the database server 128. The event data reports, generally, display the number of occurrences of generated events from different perspectives in a variety of different views. Such reports are helpful to analyze the performance of the services 102 and to detect potential problems or difficulties.

In both types of reports, the presented information is more readily used if it is related to, or broken down according to, the different services 102 with which the events are associated. Thus, it is necessary to determine which service 102 an event belongs to. Preferably, this is accomplished by using the Event ID of each event to look up its associated source code file name and path therefor which were stored in the tagged event database during "building" of the services 102. Once the source code file name and path are known, the service 102 may be determined from the source code file path as, according to the present embodiment, the service's name is part of the source code file path. For example and not limitation, if after looking up the Event ID associated with an event in the tagged event database, it is discovered that the source code file path for the source code file associated with such event is "webs\fax\faxsender\faxsender.cs", it may be determined that such event belongs to a service 102 for faxing (i.e., a "fax service 102"). Because only one team of software developers may, often, be responsible for the development of a particular service 102, once the service 102 associated with an event is identified, so is the team of software developers.

The tagging reports comprise a tagging overview report 900 and a query tagged event report 1000. The tagging overview report 900 provides a summary of the information present in the tagged event database. More specifically, the tagging overview report 900 displays the total number of events which have been identified and embedded in the source code files of services 102 by software developers on a per software development team, service 102, and event level basis. Preferably, a tagging overview report 900 is created by a user through use of a user interface which enables the user to select, from a drop down list, the available days of information which the report is to display. The query tagged event report 1000 provides a list of individual tagged event database entries which are the result of a user-specified query which is performed against the tagged event database. The user-specified query is developed by a user through selection of options of interest from a user interface presented to the user. Such options allow the user to query the tagged event database by the name of a team of developers responsible for a particular service 102, by the name of a service 102, by the name of a source code file used to create the service 102, by a software developer alias, or by a tag identifier associated with a call to a procedure 304 of the event generator API 302 related to an event or instance of a transaction. Such options also allow the user to further narrow the query to return all tagged events or only those which were created in the tagged event database after a specified date.

FIG. 9 displays an exemplary tagging overview report 900 of the event monitoring and logging system 100 in accordance with the present embodiment of the present invention. The tagging overview report 900 is, preferably, in the form of a table with most of the rows of the table being associated uniquely either with a team of software developers that is responsible for a service 102 (i.e., if the row corresponds to the top level row of an expandable group of rows) or with a service 102 (i.e., if the row corresponds to a non-top level row of an expandable group of rows). Most of the columns of the table are associated uniquely with the types and levels of events supported by the event monitoring and logging system 100 and, in connection with most rows, display the total number of embedded events of a particular type or level corresponding to each team of software developers or service 102. A total row displays the sub-totals of embedded events for each type and level of supported event, while a total column displays the sub-totals of embedded events for each team of software developers and/or service 102. A total number of files column displays the number of source code files for each team of software developers and/or service 102 which include embedded events. It should be noted that a button, denoted by a "plus" or "minus" sign, is present adjacent to each service 102 and enables the expanding/unexpanding of a row to display lower level rows of data associated with a service 102.

FIG. 10 displays a query tagged event report 1000 of the event monitoring and logging system 100, in accordance with the present embodiment of the present invention, showing the results of query by software development team against the tagged event database. The report 1000 includes, at its top, the drop down list boxes and radio buttons which form part of the user interface used by the user to specify (i.e., select) options for the report's generation. The lower portion of the report 1000 displays a table in which each row is associated with a tag entry in the tagged event database returned by the query. The columns of the table display, for each such tag entry: a tag identifier which may correspond to an Event ID or an Instance ID depending on whether the called event procedure 304 associated with the tag entry relates to an event or to an instance of a transaction; the name of the service 102 with which the tag entry is associated; the source code file name corresponding to the source code file in which the call to the associated event procedure 304 is found; the developer alias of the software developer responsible for the source code file in which the call to the associated event procedure 304 is found; the date on which the tag entry was generated in the tagged event database; the type of event or instance of a transaction designated, or specified, in the call to the associated event procedure 304 in the source code file; and, the message string associated with the tag entry.

It should be noted that the other query tagged event reports 1000 which display the results of queries of the tagged event database by the name of a service 102, by the name of a source code file used to create the service 102, by a software developer alias, or by a tag identifier generate reports 1000 appear substantially similar to the above-described query tagged event report 1000 in which the tagged event database was queried by the name of a team of software developers. Generally, the other reports 1000 include substantially the same information, but sorted in a different order for display.

FIG. 11 displays an event detail pane 1100 corresponding to a tag entry selected from a query tagged event report 1000 of the event monitoring and logging system 100, in accordance with the present embodiment of the present invention. The event detail pane 1100 is generated by a user selecting a tag entry of a query tagged event report 1000 with a pointing device. The event detail pane 1100 displays the information stored in the tagged event database (described below) for the tag entry, whether it be an event or an instance of a transaction.

The event data reports comprise an events summary report 1200, a top event list report 1300, and a tracking event report 1400 which display data related to events actually generated during the execution of services 102 on the production servers 104. Each report 1200, 1300, 1400 relates, preferably, to a specific period of time during operation of such services 102. The reports 1200, 1300, 1400 may also identify the production servers 104 on which the events were generated.

FIG. 12 displays an exemplary events summary report 1200 of the event monitoring and logging system 100 in accordance with the present invention. The events summary report 1200 displays, at its top, a user interface which is employed by a user to select and/or input a period of time (i.e., a specific day, week, or month) for which data is to be selected from the database on the database server 128 for inclusion in the report 1200. Also displayed at the top of the report 1200, is the total number of generated events during the specified period of time. The lower portion of the report 1200 is, preferably, in the form of a table with most of the rows of the table being associated uniquely either with a team of software developers that is responsible for a service 102 (i.e., if the row corresponds to the top level row of an expandable group of rows) or with a service 102 (i.e., if the row corresponds to a non-top level row of an expandable group of rows). Most of the columns of the table are associated uniquely with the types and levels of events supported by the event monitoring and logging system 100 and, in connection with most rows, display the total number of generated events of a particular type or level corresponding to each team of software developers or service 102. A total row displays the sub-totals of generated events for each type and level of supported event, while a total column displays the sub-totals of generated events for each team of software developers and/or service 102. It should be noted that a button, denoted by a "plus" or "minus" sign, is present adjacent to each service 102 and enables the expanding/unexpanding of a row to display lower level rows of data associated with a service 102.

FIG. 13 displays an exemplary top event list report 1300 of the event monitoring and logging system 100, in accordance with the present invention, showing the results of a query by software development team against the database on database server 128. The top event list report 1300, generally, provides a list of the most often actually generated events which are the result of a user-specified query which is performed against the database on the database server 128. The user-specified query is developed by a user through selection of options from a user interface presented to the user at the top of the report 1300. Such options allow the user to query the database server's database by the name of a team of developers responsible for a particular service 102, by the name of a particular service 102, by all services 102, by the name of a source code file used to create the service 102, by a software developer alias, or by a particular event type. The user interface also provides a drop down list box which enables the user to further narrow the query by selecting and/or inputting a period of time (i.e., a specific day, week, or month) for which data related to generated events is to be selected from the SQL server database for inclusion in the report 1300.

The lower portion of the report 1300 is, preferably, in the form of a table with most of the rows of the table being associated uniquely either with a generated event in the database server's database which is returned by the query (i.e., if the row corresponds to the top level row of an expandable group of rows) or with a production server 104 on which the generated event occurred (i.e., if the row corresponds to a non-top level row of an expandable group of rows). The columns of the table display, for each such generated event and/or production server 104: the number of occurrences of the generated event during the specified period of time; a percentage indicating the portion of the total number of all generated events during the specified period of time which is represented by the number of occurrences of the generated event; the name of the team of software developers which is responsible for the service 102 from which the generated event was produced; the name of the service 102 with which the generated event is associated; the developer alias of the software developer responsible for the source code file in which the call to an associated event procedure 304 which generated the event is found; the type of event or instance of a transaction designated, or specified, in the call to the associated event procedure 304 in the source code file which generated the event; and, the message string designated, or specified, in the call to the associated event procedure 304 in the source code file which generated the event. It should be noted that a button, denoted by a "plus" or "minus" sign, is present adjacent to each generated event identifier and enables the expanding/unexpanding of a row to display lower level rows of data associated with the production servers 104 on which the generated events occurred.

It should be noted that when the top event list report 1300 displays the results of other queries of the database server's database (i.e., queries by the name of a particular service 102, by all services 102, by the name of a source code file used to create the service 102, by a software developer alias, or by a particular event type), the top event list report 1300 appears substantially similar to the above-described top event list report 1300 in which the database server's database was queried by the name of a team of software developers. However, a column which is queried on is not shown because all of the data for such column is identical, and the generated event entries in the lower portion of the report 1300 may be sorted in a different order for display.

Figure 14:
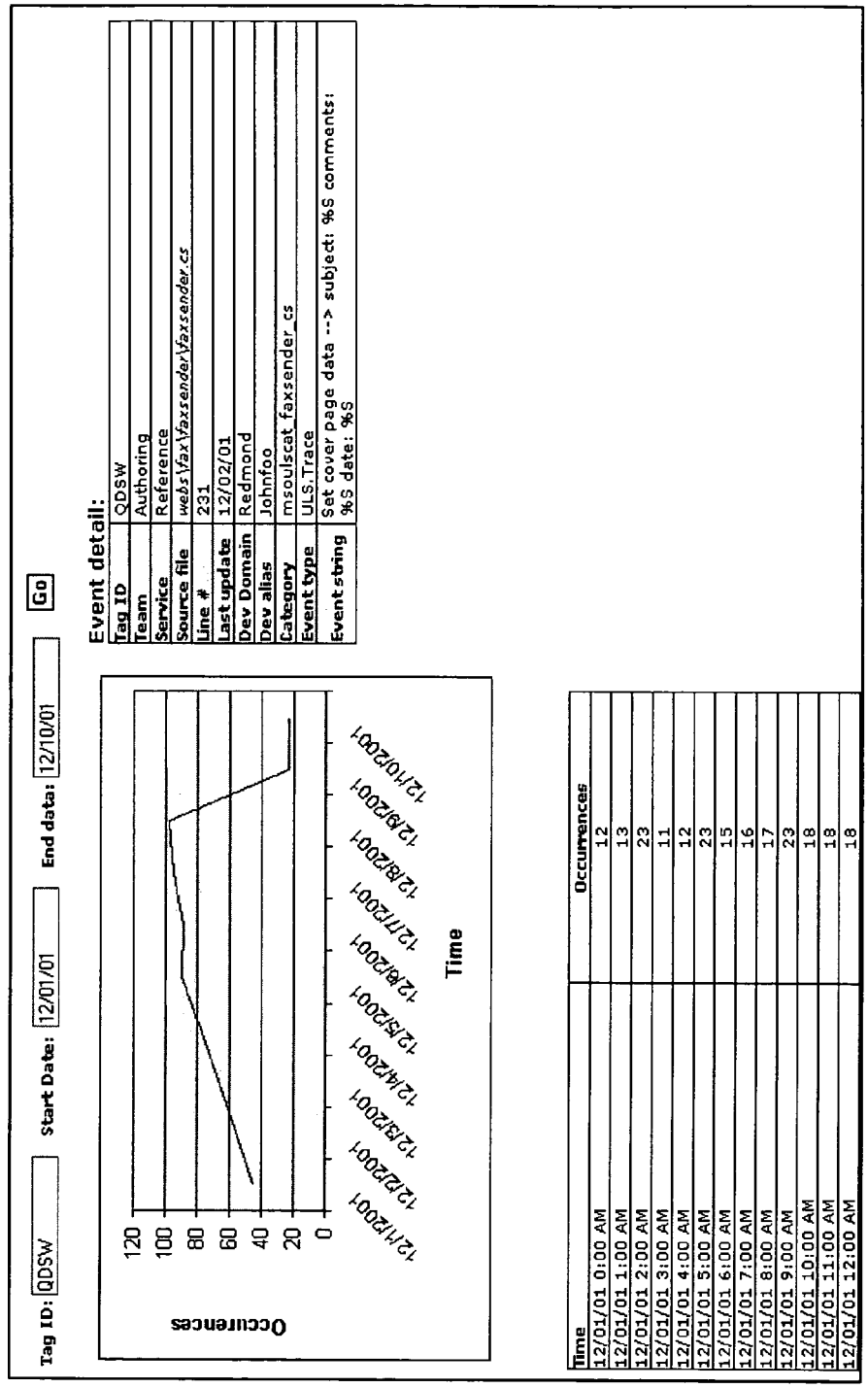
FIG. 14 displays an exemplary tracking event report of the event monitoring and logging system in accordance with the embodiment of the present invention.

FIG. 14 displays an exemplary tracking event report 1400 of the event monitoring and logging system 100 in accordance with the present invention. The tracking event report 1400 corresponds to a generated event entry (i.e., a row) displayed in the lower portion of a top event list report 1300 and displays the information stored in the database of the database server 128 for the generated event, whether it be an event or an instance of a transaction. The tracking event report 1400 may be generated by a user selecting a generated event entry of a top event list report 1300 with a pointing device or by selecting the report 1400 from the user interface of the web server 132.

The tracking event report 1400, as illustrated in FIG. 14, comprises a user interface area at the top of the report 1400 including a text box which enables the user to input a generated event identifier corresponding to a generated event for which event information is desired by the user if the report 1400 is not initiated by the user selecting a generated event entry from the top event list report 1300 with a pointing device. The user interface also provides text boxes which enable the user to input starting and ending dates that define the period of time for which the user desires to view data related to the specified generated event.

The tracking event report 1400 also comprises a chart which displays, in graphical form, the number of occurrences of the generated event relative to each day during the period of time specified by the user via the input starting and ending dates. The chart enables the user to very easily view trends related to the number of occurrences of the generated event over time. Additionally, the tracking event report 1400 additionally comprises an event detail table which displays the data associated with the embedded event which produced the generated event, as such data is stored in the tagged event database. In addition, the tracking event report 1400 further comprises a table showing the number of occurrences of the generated event on an hourly basis for the period of time specified by the input starting and ending dates.

Although not a report, the web server 132 is operable to assist a software developer or other non-data center personnel in ascertaining the name and location of an event log data file 328 containing generated event information desired for use in problem diagnosis or debugging with respect to one or more generated events that are known to have occurred on a particular production server 104, on a particular date, and at or near an particular time. Thus, the web server 132 further comprises a find log file utility 1500, displayed in FIG. 15, which is accessible to a user via the web server's user interface and has a plurality of computer software instructions which are executable by the web server 132.

The find log file utility 1500 includes a user interface 1502 having a text box for user input of the name of a production server 104 on which the generated event(s) occurred, a date selector for user selection of a date corresponding to the date on which an event log data file 328 is desired, and a text box for user input of an approximate time at which the generated event(s) occurred. Also, the user interface 1502 includes a table for displaying the names of the event log data files 328 and associated times corresponding to the starting times at which the respective event log data files 328 were created and put into use logging generated events and associated event information. Additionally, the user interface 1502 includes an output area below the table for displaying the location of the event log data files 328 which may be displayed in the table.

In operation, a user desiring to locate the appropriate event log data file 328 containing event information corresponding to a generated event(s), inputs the following information via the user interface 1502: the name of the production server 104 on which the generated event(s) occurred, the date on which the generated event(s) occurred, and the approximate time at which the generated event(s) occurred. In response, the find log file utility 1500 determines the names of the event log data files 328 and, for each event log data file 328, the corresponding time at which the event log data file 328 was created and went into use for the logging of generated event information. The find log file utility 1500 displays the names of the event log data files 328 and corresponding times in the table of the user interface 1502, and displays the location of the event log data files 328 (including, the path name to such location) in the output area beneath the table.

Whereas this invention has been described in detail with particular reference to an embodiment thereof, it is understood that variations and modifications can be effected within the spirit and scope of the invention, as described herein before and as defined in the appended claims. The corresponding structures, materials, acts, and equivalents of all means plus function elements, if any, in the claims below are intended to include any structure, material, or acts for performing the functions in combination with other claimed elements as specifically claimed.

What is claimed is:

1. A system for monitoring and logging events generated during the execution of an on-line service application, said system comprising:
    an event generator software module residing on a production server computer adapted to execute an on-line service application thereon, said event generator software module being operable to cause the generation of events and associated event data representative of the performance of said on-line service application during execution thereof by said production server computer;
    an event router software module residing on said production server computer and being operable to receive said events and associated event data and to produce a stream of events and associated event data for real-time event monitoring;
    a controller software module residing on said production server computer and being adapted to control operation or said event router software module and to reconfigure operation of said event router software module during execution of said on-line service application;
    a real-time event monitor software module residing on said production server computer and being configurable with threshold criteria related to said events and associated event data, said real-time event monitor software module being operable to receive said stream of events and associated event data and to generate alerts and associated alert data in response to said threshold criteria being exceeded by said events of said stream of events; and a near real-time event monitor software module residing on said production server and being configurable with threshold criteria related to said events and associated event data, said near real-time event monitor software module being operable to periodically read the threshold criteria and the associated event data to determine changes and, if it is determined that changes have been made, the near real-time event monitor is further operable to reconfigure itself using the changed threshold criteria and the changed associated event data.

2. The system of claim 1, wherein said event generator software module includes respective software routines corresponding to said events and associated event data, and wherein said event generator software module is further operable to cause the generation of said events and associated event data in response to references to said software routines embedded in said on-line service application being encountered and acted upon during execution of said on-line service application.

3. The system of claim 1, wherein at least one of said events has a level associated therewith during coding of said on-line service application, wherein said event router software module has a configurable parameter identifying a level for use in selecting which of said events is to be written to an event log data file, and wherein said event router software module is further operable to select said at least one of said events during execution of said on-line service application for writing to an event log data file based at least in part upon a comparison of said level associated with said at least one of said events and said level identified by said configurable parameter.

4. The system of claim 3, wherein said level identified by said configurable parameter is reconfigurable during execution of said on-line service application.

5. The system of claim 3, wherein said level associated with said at least one of said events is related to the volume of event data associated with said at least one of said events written to an event log data file upon the selection of said at least one of said events for writing to an event log data file.

6. The system of claim 1, wherein at least one of said events has a category associated therewith during coding of said on-line service application, wherein said event router software module has a configurable parameter identifying a category for use in selecting which of said events is to be written to an event log data file, and wherein said event router software module is further operable to select said at least one of said events during execution of said on-line service application for writing to an event log data file based at least in part upon a comparison of said category associated with said at least one of said events and said category identified by said configurable parameter.

7. The system of claim 6, wherein said category identified by said configurable parameter is reconfigurable during execution of said on-line service application.

8. The system of claim 6, wherein said category associated with said at least one of said events identifies a source code file of said on-line service application.

9. The system of claim 1, wherein said event router software module is further operable to create buffers for receiving said events and associated event data, and wherein the minimum number of said buffers is reconfigurable during execution of said on-line service application.

10. The system of claim 1, wherein said event router software module is further operable to create buffers for receiving said events and associated event data, and wherein the maximum number of said buffers is reconfigurable during execution of said on-line service application.

11. The system of claim 1, wherein said event router software module is further operable to create buffers for receiving said events and associated event data, and wherein the size of said buffers is reconfigurable during execution of said on-line service application.

12. The system of claim 1, wherein said event router software module is further operable to create buffers for receiving said events and associated event data, and wherein the time interval between flushes of said buffers is reconfigurable during execution of said on-line service application.

13. The system of claim 1, wherein said event router software module is further operable to write said events and associated event data to an event log data file having a storage location, and wherein said storage location of said event log data file is reconfigurable during execution of said on-line service application.

14. The system of claim 1, wherein said event router software module is further operable to write said events and associated event data to an event log data file having a file name, and wherein said file name of said event log data file is reconfigurable during execution of said on-line service application.

15. The system of claim 14, wherein said production server computer has an associated identifier uniquely identifying said production server computer, and wherein said file name of said event log data file is based at least in part on said identifier of said production server computer.

16. The system of claim 14, wherein said event log data file has a creation time associated therewith, and wherein said file name of said event log data file is based at least in part on said creation time.

17. The system of claim 1, wherein said event log data file is a first event log data file and said event router software module is further operable to write said events and associated event data to said first event log data file during a time interval and to a second event log data file after expiration of said time interval, and wherein said time interval is reconfigurable during execution of said on-line service application.

18. The system of claim 1, wherein said controller software module is further operable to enable and disable operation of said event router software module.

19. The system of claim 1, wherein said stream of events and associated event data comprises a first stream of events and said event router software module is further operable to produce a second stream of events and associated event data for non-real-time event monitoring, and wherein said event router software module is further operable to select events and associated event data generated by said event generator software module for inclusion in at least one of said first stream of events and associated event data and said second stream of events and associated event data.

20. The system of claim 1, wherein said stream of events and associated event data comprises a first stream of events and said event router software module is further operable to produce a second stream of events and associated event data, and wherein said system further comprises a non-real-time event monitor software module operable to monitor events and associated event data not monitored by said real-time event monitor software module.

21. The system of claim 1, wherein said stream of events and associated event data comprises a first stream of events and said event router software module is further operable to produce a second stream of events and associated event data for writing to an event log data file, and wherein said system further comprises an event log data file collector software module residing on a processing server computer communicatively connected to said production server computer, said event log data file collector software module being operable to retrieve said event log data file from said production server computer.

22. The system of claim 21, wherein said event log data file is a first event log data file, wherein said event router software module is further operable to write said events and associated event data to a second event log data file, wherein said event log data file collector software module is operable to retrieve said first event log data file at a first time and said second event log data file at a second time, and wherein the time interval between said first time and said second time is reconfigurable during execution of said on-line service application.

23. The system of claim 21, wherein said event log data file is a first event log data file and said production server computer is a first production server computer, and wherein said event log data file collector software module is operable to retrieve a second event log data file from a second production server computer.

24. The system of claim 23, wherein said second production server computer has a unique identifier associated therewith, and wherein said event log data file collector software module is reconfigurable during execution of said on-line service application with said unique identifier associated with said second production server computer to cause retrieval of said second event log data file from said second production server computer.

25. The system of claim 23, wherein said on-line service application is a first on-line service application, and wherein said second event log data file is associated with a second on-line service application.

26. The system of claim 1, wherein said stream of events and associated event data comprises a first stream of events and said event router software module is further operable to produce a second stream of events and associated event data for writing to an event log data file, and wherein said system further comprises an event log data file processor computer software module residing on a processing server computer communicatively connected to said production server computer, said event log data file processor software module being operable to convert said events and associated event data of said event log data file into a textual format.

27. The system of claim 1, wherein said stream of events and associated event data comprises a first stream of events and said event router software module is further operable to produce a second stream of events and associated event data for writing to an event log data file, and wherein said system further comprises an event log data file processor computer software module residing on a processing server computer communicatively connected to said production server computer, said event log data file processor software module being operable to communicate said events and associated event data of said event log data file for storage in a database of an archive server computer communicatively connected to said processing server computer.

28. A system for monitoring and logging events generated during the execution of an on-line service application, said system comprising:

an event generator software module residing on a production server computer adapted to execute an on-line service application thereon, said event generator software module comprising software routines operable to cause the generation of events and associated event data representative of the performance of said instrumented on-line service application when embedded references to said software routines are encountered during execution of said on-line service application by said production server computer;

an event router software module residing on said production server computer and being operable to receive said events and associated event data and to produce a stream of events and associated event data for real-time event monitoring, wherein at least one of said events enables tracking of the duration of a multi-stage process of said on-line service application when more than one instance of the process is contemporaneously executing on the production server computer and allows a multiple of said events to be identified as children of a single transaction; and a real-time event monitor software module residing on said production server computer and being configurable with threshold criteria related to said events and associated event data, said real-time event monitor software module being operable to receive said stream of events and associated event data and to generate alerts and associated alert data in response to said threshold criteria being exceeded by said events of said stream of events, said threshold criteria being reconfigurable during execution of said on-line service application.

29. The system of claim 28, wherein at least one of said events corresponds to a critical condition occurring during execution of said on-line service application and requiring notification of a person at least partially responsible for the operation of said on-line service application.

30. The system of claim 28, wherein at least one of said events enables logging of diagnostic data representing the state of said on-line service application during execution at a desired location in source code thereof.

31. The system of claim 28, wherein at least one of said events enables a determination as to when handled exceptions occur during execution of said on-line service application.

32. The system of claim 28, wherein at least one of said events enables designation of a specified variable for logging of performance data associated with the execution of said on-line service application.

33. The system of claim 32, wherein said at least one of said events enables incrementing of said specified variable.

34. A method of monitoring and logging the occurrence of pre-identified events generated during execution of an on-line service application, the method comprising the steps of:

receiving a threshold criterion having associated threshold criterion data for use in determining whether an alert having associated alert data is to be generated upon the occurrence of a pre-identified condition during execution of an on-line service application, the threshold criterion being configurable during execution of the on-line service application;

generating an event having associated event data upon the occurrence of the pre-identified condition during execution of the on-line service application;

after generating the event, evaluating the threshold criterion substantially in real-time using the threshold criterion data and the generated event data to determine whether the threshold criterion is met; and if the threshold criterion is met, producing an alert having associated alert data corresponding to the occurrence of the pre-identified condition and to the threshold criterion having been met, the associated alert data comprising a string including at least one current value of the threshold criterion data utilized in evaluating the threshold criterion.

35. The method of claim 34, wherein the method further comprises a step of communicating an alert and associated alert data to a device for presentation in substantially real-time to a person at least partially responsible for operation of the on-line service application.

36. The method of claim 34, wherein the generated event has an associated event identifier, wherein the threshold criterion data includes an event identifier, and wherein the step of evaluating includes comparing the event identifier associated with the generated event against the event identifier of the threshold criterion.

37. The method of claim 34, wherein the generated event has an associated event level, wherein the threshold criterion data includes an event level, and wherein the step of evaluating includes comparing the event level associated with the generated event against the event level of the threshold criterion.

38. The method of claim 34, wherein the generated event is one generated event of a plurality of generated events, wherein a portion of the generated events of the plurality of generated events correspond to transactions, wherein the threshold criterion data includes a number of occurrences of a particular transaction, an event identifier corresponding to the particular transaction, a time interval, and a completion time for each instance of the particular transaction, and wherein the step of evaluating includes determining whether the number of occurrences of a transaction having the event identifier of the threshold criterion data and occurring within the time interval of the threshold criterion data require more than the completion time of the threshold criterion data to complete.

* * * * *

UNITED STATES PATENT AND TRADEMARK OFFICE
CERTIFICATE OF CORRECTION

| | | |
|---|---|---|
| PATENT NO. | : 7,379,999 B1 | Page 1 of 1 |
| APPLICATION NO. | : 10/685641 | |
| DATED | : May 27, 2008 | |
| INVENTOR(S) | : Sheng Zhou et al. | |

It is certified that error appears in the above-identified patent and that said Letters Patent is hereby corrected as shown below:

In column 36, line 61, in Claim 1, delete "or" and insert -- of --, therefor.

Signed and Sealed this
Twelfth Day of April, 2011

David J. Kappos
*Director of the United States Patent and Trademark Office*